US012031890B2

(12) United States Patent
Jasperse et al.

(10) Patent No.: US 12,031,890 B2
(45) Date of Patent: Jul. 9, 2024

(54) LYSIS DEVICES HAVING A PIEZO ELEMENT AND METHODS

(71) Applicant: Siemens Healthcare Diagnostics Inc., Tarrytown, NY (US)

(72) Inventors: Jeffrey R. Jasperse, Newton, MA (US); Peter Paulicka, Forchheim (DE); Paul Benson, Quincy, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/007,058

(22) PCT Filed: Jul. 23, 2021

(86) PCT No.: PCT/US2021/042953
§ 371 (c)(1),
(2) Date: Jan. 27, 2023

(87) PCT Pub. No.: WO2022/031459
PCT Pub. Date: Feb. 10, 2022

(65) Prior Publication Data
US 2023/0213414 A1 Jul. 6, 2023

Related U.S. Application Data

(60) Provisional application No. 63/060,301, filed on Aug. 3, 2020.

(51) Int. Cl.
*G01N 1/28* (2006.01)
*B01L 3/00* (2006.01)
(Continued)

(52) U.S. Cl.
CPC ........ *G01N 1/286* (2013.01); *B01L 3/502715* (2013.01); *G01N 29/036* (2013.01);
(Continued)

(58) Field of Classification Search
CPC .... G01N 1/286; G01N 29/348; G01N 29/036; B01L 2400/0436; B01L 2300/12;
(Continued)

(56) References Cited

U.S. PATENT DOCUMENTS 5,375,595 A 12/1994 Sinha et al.
6,690,958 B1* 2/2004 Walker ................ A61B 8/4416
600/407
(Continued)

FOREIGN PATENT DOCUMENTS

EP 4090465 A2 11/2022
JP S60192249 A 9/1985
(Continued)

OTHER PUBLICATIONS

International Search Report and Written Opinion of International Application No. PCT/US2021/042953 dated Dec. 30, 2021.

*Primary Examiner* — Matthew D Krcha
*Assistant Examiner* — Tingchen Shi

(57) ABSTRACT

A lysis device including a sample vessel, at least one piezo element, and a controller is disclosed. The sample vessel has a microchannel formed therein. The sample vessel has at least one port extending through a surface to the microchannel. The piezo element is attached to the surface of the sample vessel. The controller has logic to cause the controller to emit a first signal including a series of frequencies to the at least one piezo element to cause the at least one piezo element to generate ultrasonic acoustic standing waves in the sample vessel, to receive a second signal indicative of measured vibration signals from the sample vessel detected by the at least one piezo element, and to determine a resonant frequency of the sample vessel using the measured vibration signals.

19 Claims, 16 Drawing Sheets

(51) Int. Cl.
*G01N 29/036* (2006.01)
*G01N 29/34* (2006.01)
(52) U.S. Cl.
CPC .... *G01N 29/348* (2013.01); *B01L 2300/0627* (2013.01); *B01L 2300/0861* (2013.01); *B01L 2300/12* (2013.01); *B01L 2400/0436* (2013.01)
(58) Field of Classification Search
CPC ..... B01L 2300/0861; B01L 2300/0627; B01L 3/502715
See application file for complete search history.

(56) References Cited

U.S. PATENT DOCUMENTS

| | | | |
|---|---|---|---|
| 9,096,823 B1* | 8/2015 | Branch | B01L 3/5027 |
| 9,097,701 B2 | 8/2015 | Krogh | |
| 2009/0099485 A1* | 4/2009 | Sarvazyan | A61N 7/00 |
| | | | 601/2 |
| 2010/0015691 A1 | 1/2010 | Krogh | |
| 2013/0012927 A1* | 1/2013 | Schafer | C12M 47/06 |
| | | | 604/542 |
| 2015/0177111 A1 | 6/2015 | Warner et al. | |
| 2016/0097696 A1 | 4/2016 | Zusman | |
| 2017/0122911 A1 | 5/2017 | McCarron et al. | |
| 2018/0003624 A1 | 1/2018 | Steinbacher | |
| 2019/0121460 A1* | 4/2019 | Ting | G06F 1/3262 |

FOREIGN PATENT DOCUMENTS

| | | |
|---|---|---|
| JP | H11326155 A | 11/1999 |
| JP | 2006506607 A | 2/2006 |
| JP | 2011503562 A | 1/2011 |
| JP | 2015503760 A | 2/2015 |
| JP | 2019062890 A | 4/2019 |
| JP | 2020502539 A | 1/2020 |
| WO | 2009144209 A1 | 12/2009 |
| WO | 2021222084 A1 | 11/2021 |

* cited by examiner

Side Holder With Two Digital Temperature Sensors (Near of Inlet and Outlet) and Two Peltier Elements for Thermal Control

| Absorbance | Transmittance |
|---|---|
| 0 | 1 |
| 0.1 | 0.79 |
| 0.25 | 0.58 |
| 0.5 | 0.32 |
| 0.75 | 0.18 |
| 0.0 | 0.13 |
| 1 | 0.1 |
| 2 | 0.01 |
| 3 | 0.001 |

$T(\lambda)$ Transmitted Power $T_0(\lambda)$ Incident Before Sample $e(\lambda)$ Extinction Coefficient $d$ Sample's Pathlength (at Specific Wavelength)

$$T(\lambda) = T_0(\lambda)e^{-ce(\lambda)d}$$

$$\text{Absorption Spectrum} = -log\left(\frac{T(\lambda)}{T_0(\lambda)}\right)$$

LYSIS DEVICES HAVING A PIEZO ELEMENT AND METHODS

This application claims benefit under 35 USC § 119(e) of U.S. Provisional Application No. 63/060,301, filed Aug. 3, 2020. The entire contents of the above-referenced patent application(s) are hereby expressly incorporated herein by reference.

FIELD OF THE DISCLOSURE

The disclosure generally relates to devices, systems, and methods for testing blood samples. More particularly the disclosure relates to a lysis device configured for lysing red blood cells in a sample vessel by means of ultrasonic acoustic waves, shear forces, pressure, and/or fluid movement, generated in the vessel by an acoustic transducer driven at one or more particular excitation frequency, or range of frequencies. In some non-limiting embodiments, the ultrasonic acoustic waves are generated by one or more acoustic transducers. The lysis device may be used in conjunction with blood sample testing analyzers.

BACKGROUND

Point-of-care testing refers generally to medical testing at or near the site of patient care, such as in an emergency room. A desired outcome of such tests is often rapid and accurate lab results to determine a next course of action in the patient care. A number of such point-of-care tests involves analysis of a blood sample from the patient. Many of these tests use whole blood, plasma, or serum.

In some tests, the cell walls of red blood cells in the blood sample are ruptured (lysed) to release hemoglobin. Lysis of the red blood cells may be referred to as hemolysis. Typically, hemolysis was done with chemical or mechanical means.

Some devices lyse the red blood cells using ultrasound. Some point-of-care testing devices use spectrophotometric optical absorption measurement for the determination of the oximetry parameters on a whole blood sample. These devices are fluidic systems that typically position the patient blood sample in a slide cell sample chamber for testing the blood sample. For example, one system described in U.S. Pat. No. 9,097,701 ("Apparatus for Hemolyzing a Blood Sample and for Measuring at Least One Parameter Thereof", issued Aug. 4, 2015) uses two piezo elements, with two balanced resonant elements, surrounding a sample chamber symmetrically, to lyse the red blood cells using acoustophoretic forces.

Generally, piezo electric transducers need to be driven at an optimum frequency and amplitude to achieve best performance. For example, best performance may include the frequency and/or amplitude needed to perform a desired result in the shortest amount of time. In the case of such fluidic systems, the optimum frequency may take into account composition of the vessel, blood sample, surrounding systems, and/or the like. If such fluidic systems are driven at non-optimum performance, the blood sample risks overheating, clotting, transformation inconsistency and/or the like. Further, different materials and variations of production in parts, consistency in the blood sample (e.g., turbidity, RBC density, RBC volume) may produce a wide range of viscosity and/or elasticity affecting results of the system, such as impedance. Determination of optimum frequency and/or amplitude for the piezo electric transducer may aid in providing optimum results within the shortest time period with minimal temperature increases, for example. Additionally, calibration throughout the life of the lysis system may improve results.

SUMMARY

Acoustophoretic lysis devices, methods, and systems are disclosed. In particular, acoustophoretic lysis devices having optimal frequency and/or amplitude are disclosed.

Consistent with an aspect of the present disclosure, an exemplary lysis device may comprise a sample vessel having an outer surface, a microchannel within the confines of the outer surface, at least one port extending through the outer surface to the microchannel. A blood sample may be insertable through the at least one port into the microchannel. At least one piezo element may be adjacent to the outer surface of the sample vessel and serve as an acoustic transducer. The at least one piezo element may be configured to generate ultrasonic acoustic standing waves in the microchannel. The at least one piezo element may also be configured to measure a vibration signal generated from the sample vessel and/or fluidic sample. By comparing the ultrasonic acoustic standing wave to the resulting vibration signal, resonant frequency may be determined. The piezo element may then generate ultrasonic acoustic standing waves based on the determined resonant frequency (e.g., excluding the resonant frequency or including the resonant frequency). The ultrasonic acoustic standing waves may be used to lyse cells within the fluidic sample, bend the sample vessel such that shear forces are induced within the microchannel, cause cavitation in the blood sample thereby rupturing cell walls in the blood sample and/or the like.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1A:
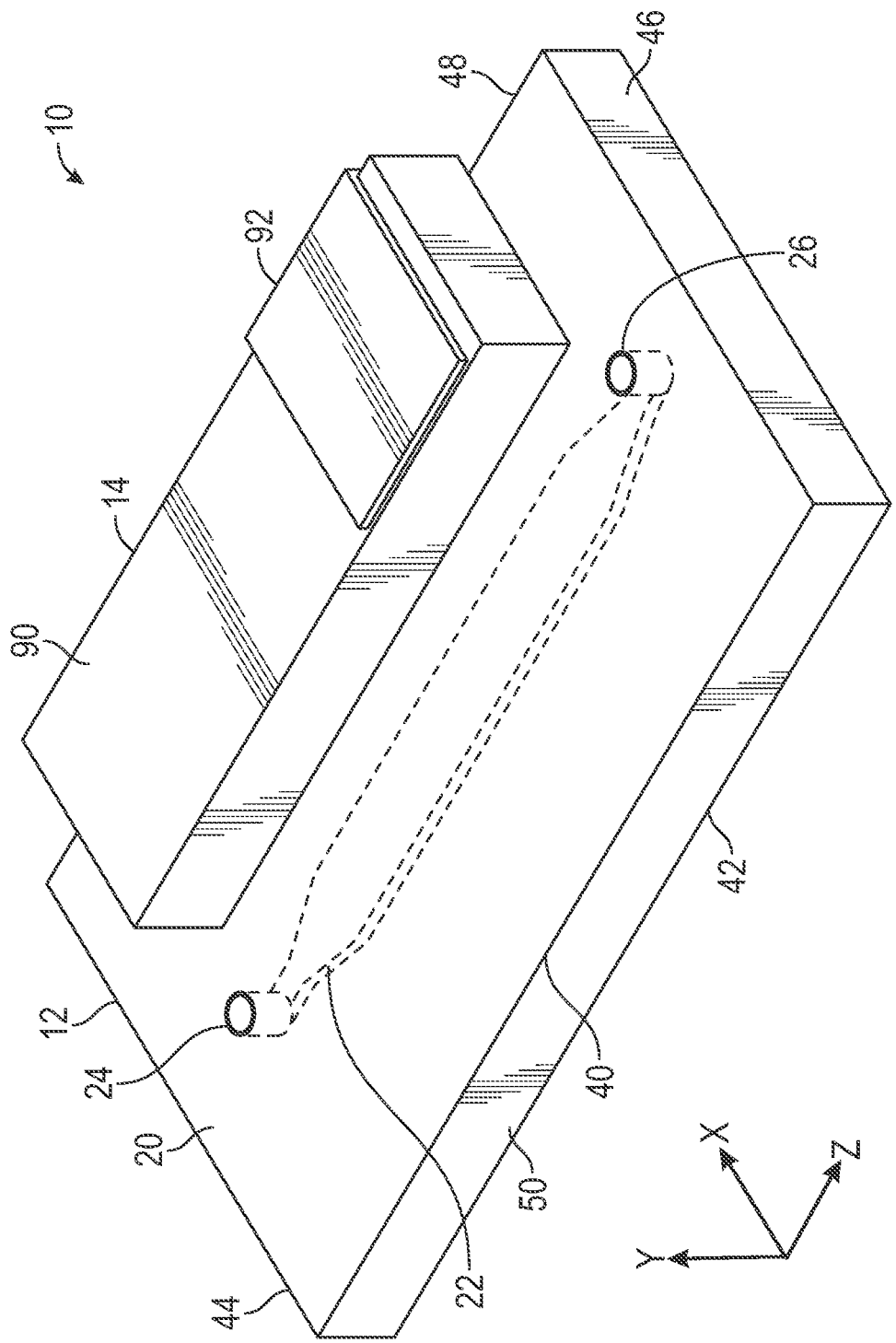
FIG. 1A is a perspective view of an exemplary acoustophoretic lysis device in accordance with the present disclosure.

The following detailed description refers to the accompanying drawings. The same reference numbers in different drawings may identify the same or similar elements.

The mechanisms proposed in this disclosure circumvent the problems described above. The present disclosure describes lysis devices, analyzers, and lysis methods, including a lysis device configured to lyse red blood cells in a sample vessel by means of ultrasonic acoustic waves, shear forces, pressure, and/or fluid movement, generated in the sample vessel by at least one piezo element connected to the sample vessel and driven at one or more particular excitation frequency, or range of excitation frequencies. In some embodiments, the at least one piezo element is a single piezo electric transducer configured to generate acoustic waves and configured to measure vibration signals as described herein. In some embodiments, the at least one piezo element may be a first piezo electric transducer configured to generate acoustic waves and a second piezo electric sensor configured to measure vibration signals from the sample vessel. In some embodiments, the at least one piezo element may be a first piezo electric transducer configured to generate acoustic waves and a sensor is provided to measure the resulting vibration signal. In some embodiments, the sensor configured to measure vibration signals is external and separate from the lysis device. The present disclosure further describes an analyzer configured to receive and interact with the lysis device for calibrating the piezo element and/or testing a sample in the sample vessel, as well as methods of use.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the Figures, and in particular to FIGS. 1-8, an exemplary lysis device 10 is shown in accordance with the present disclosure. In general, the lysis device 10 is an acoustophoretic lysis device having a sample vessel 12 and at least one piezo element 14 attached (e.g., bonded, spring loaded, matingly engaged) to the sample vessel 12. In some embodiments, the lysis device 10 may be a monolithic structure, such as that formed by the sample vessel 12 and the at least one piezo element 14 bonded together using a suitable bonding material, such as epoxy, for example. In some embodiments, the at least one piezo element 14 may be a single piezo transducer, such as, for example, a single piezo electric transducer configured to generate acoustic waves and measure vibration signals. In some embodiments, the at least one piezo element 14 may be a plurality of piezo elements including a first piezo transducer configured to generate acoustic waves and a second piezo sensor configured to measure vibration signals as described in further detail herein. In some embodiments, one or both of the first piezo transducer or the second piezo sensor may be spring loaded to the sample vessel 12. In some embodiments, one or both of the first piezo transducer or the second piezo sensor may be bonded to the sample vessel 12.

The sample vessel 12 has an outer surface 20, a microchannel 22 within the confines of the outer surface 20, a first port 24 extending through the outer surface 20 to the microchannel 22 and in fluid communication with the microchannel 22, and a second port 26 extending through the outer surface 20 to the microchannel 22 and in fluid communication with the microchannel 22. In some embodiments, the outer surface 20 may have one or more mounting areas for the at least one piezo element 14. In some embodiments, the outer surface 30 may have one or more mounting areas for multiple piezo elements 14.

In some embodiments, the sample vessel 12 has a top 40, a bottom 42, a first end 44, a second end 46, a first side 48, and a second side 50, wherein the first side 48 and the second side 50 extend between the first end 44 and the second end 46 and between the top 40 and the bottom 42. In some embodiments, the top 40 and the bottom 42 may be planar. In some embodiments, the first side 48 and the second side 50 may be planar. In some embodiments, the first end 44 and the second end 46 may be planar. In some embodiments, the top 40, the bottom 42, the first end 44, the second end 46, the first side 48, and the second side 50 may cooperate to form a three-dimensional rectangular cuboid. It should be noted that each of the planar configurations described above may be altered and any fanciful design may be used based on design considerations.

The sample vessel 12 may be partially, substantially, or completely transparent. For example, in some embodiments, the sample vessel 12 may be transparent at least above and below the microchannel 22, such that a medium 9 (e.g., light) may pass through the sample vessel 12 through the microchannel 22, interact with a substance within the microchannel 22, and/or pass out or through the sample vessel 12.

The sample vessel 12 may be constructed of any material capable of being partially, substantially, and/or completely transparent. For example, in some embodiments, the sample vessel 12 may be formed of glass, plastic, and/or the like. In some embodiments, material composition of the sample vessel 12 may have a Young's modulus within a range from about 50 Gpa to about 90 Gpa. In some embodiments, the sample vessel 12 may be constructed of plastic with a rigidity and/or Young's modulus similar to that of glass. In some embodiments, the sample vessel 12 may be constructed from alkali borosilicate glass. One example of alkali borosilicate glass, marketed under the name "D 263 T ECO Thin Glass", and distributed by Schott Advanced Optics, having a principle place of business in Duryea, PA.

The sample vessel 12 has a length $L_{SV}$ from the first end 44 to the second end 46, a width $w_{SV}$ from the first side 48 to the second side 50, a thickness $t_{SV}$ between the top 40 and the bottom 42, and an aspect ratio defining the proportional relationship between the length and the width. The sample vessel 12 has a longitudinal axis along the length $L_{SV}$ and a latitudinal axis along the width $w_{SV}$.

In some embodiments, aspect ratio of the sample vessel 12 may be in a range from approximately 0.5 to approximately 3.0. In some embodiments, aspect ratio of the sample vessel 12 may be in a range from approximately 1.4 to approximately 1.9. In some embodiments, the length $L_{SV}$ may be approximately twenty-two millimeters and the width $w_{SV}$ may be approximately twelve millimeters, for example. In some embodiments, the length $L_{SV}$ may be approximately seventeen millimeters and the width $w_{SV}$ may be approximately twelve millimeters, for example. In some embodiments, the length $L_{SV}$ may be approximately seventeen millimeters and the width $w_{SV}$ may be approximately six millimeters, for example. In some embodiments, the length $L_{SV}$ may be approximately twelve millimeters and the width $w_{SV}$ may be approximately six millimeters, for example.

Referring to FIGS. 1-8 and 15, the microchannel 22 may be configured to receive a blood sample 52, including, but not limited to, a blood sample, a "blank" sample, and/or a washing solution sample, through the first port 24 and/or the second port 26. The microchannel 22 has a length, a width, and a height. Typically, the length $L_M$ of the microchannel 22 may be oriented along the longitudinal axis of the sample vessel 12 and the width $w_M$ of the microchannel 22 may be oriented along the latitudinal axis of the sample vessel 12. However, it will be understood that the microchannel 22 may be oriented at an angle from or offset from the longitudinal axis and/or the latitudinal axis of the sample vessel 12.

The microchannel 22 has an aspect ratio defining the proportional relationship between the width $w_M$ and the height $h_M$ of the microchannel 22. In some embodiments, the width $w_M$ to height $h_M$ aspect ratio of the microchannel 22 may be in a range from approximately 0.04 to approximately 0.175, for example. In some embodiments, the width $w_M$ to height $h_M$ aspect ratio of the microchannel 22 may be in a range from approximately 0.04 to approximately 0.125, for example. In some embodiments, the width $w_M$ to height $h_M$ aspect ratio of the microchannel 22 is approximately 0.05, for example.

In some embodiments, the width $w_M$ of the microchannel 22 may be about two millimeters, for example. In some embodiments, the width $w_M$ of the microchannel 22 may be greater than an illumination width of a light yield area of the absorbance spectrophotometer 102. An illumination width may be defined as the width of a cross-section of the light yield along an optical pathway from the absorbance spectrophotometer 102 where the optical pathway intersects the microchannel 22. For example, when the illumination diameter is between 1 millimeter and 1.5 millimeter, then the width $w_M$ of the microchannel 22 may be at least approximately 1.6 millimeters. The width $w_M$ of the microchannel 22 may be determined to allow for adequate mechanical alignment between the microchannel 22 and optical pathway. For example, for an illumination width between 1 millimeter and 1.5 millimeter, the width $w_M$ of the microchannel 22 may be approximately two millimeters.

In some embodiments, the length of the microchannel 22 may be between approximately ten millimeters and approximately twelve millimeters. In some embodiments, the length $L_M$ of the microchannel 22 may be at least approximately four millimeters, for example. In some embodiments, the length $L_M$ of the microchannel 22 may be between approximately four millimeters and approximately twenty millimeters, for example.

In some embodiments, the length $L_M$ of the microchannel 22 may be based at least in part on a predetermined number of acoustic nodes to be created in the microchannel 22. For example, the length $L_M$ microchannel 22 may be based on the width $w_M$ of approximately two millimeters and wherein whole blood wave propagation speed is approximately 1500 m/s, a calculated single acoustic node is at 350 kHz. The acoustic nodes may be distributed in the microchannel 22 evenly spaced along the length of the microchannel 22 (for example, 2×2 mm=4 mm), wherein high pressure creates a uniform distribution of lysed blood. For example, if the predetermined number of acoustic nodes is five nodes on each side wall of the microchannel 22 (see FIG. 13), then the length $L_M$ of the microchannel 22 may be set at approximately seventeen millimeters.

The height $h_M$ of the microchannel 22 may vary, as discussed below. The height $h_M$ of the microchannel 22 may be based on the amount of absorption in lysed blood of the light yield from the absorbance spectrophotometer 102 and the desired precision of the absorption. For example, the desired absorption may be at approximately 1 Optical Density (OD).

In some embodiments, the height $h_M$ of the microchannel 22 may be about 100 micrometers, for example. In some embodiments, the height $h_M$ of the microchannel 22 may be about 150 micrometers, for example. In some embodiments, the height $h_M$ of the microchannel 22 may be about 250 micrometers, for example. In some embodiments, the height $h_M$ of the microchannel 22 may be about 300 micrometers, for example. In some embodiments, the height $h_M$ of the microchannel 22 may be between approximately 80 micrometers and approximately 300 micrometers, for example. In some embodiments, the height $h_M$ of the microchannel 22 may be between approximately 80 micrometers and approximately 150 micrometers, for example.

The first port 24 and the second port 26 may be fluidly connected to the microchannel 22 and extend from the microchannel 22 through the outer surface 20 of the sample vessel 12. In some embodiments, the first port 24 is fluidly connected to the microchannel 22 and may extend from the microchannel 22 to the top 40, the bottom 42, the first end 44, the second end 46, the first side 48, and/or the second side 50 of the sample vessel 12. In some embodiments, the second port 26 is fluidly connected to the microchannel 22 and may extend from the microchannel 22 to the top 40, the bottom 42, the first end 44, the second end 46, the first side 48, and/or the second side 50 of the sample vessel 12. The first port 24 and the second port 26 may extend to the same or to different ones of the top 40, the bottom 42, the first end 44, the second end 46, the first side 48, and/or the second side 50.

In some embodiment, the first port 24 and the second port 26 each have a diameter of between approximately 0.5 millimeter (500 micrometers) and approximately 1.5 millimeter (1500 micrometers). In some embodiments, the first port 24 and the second port 26 each have a diameter of approximately 0.8 millimeter (800 micrometers).

In some embodiments, the sample vessel 12 may be a monolithic fabrication, either in that the sample vessel 12 is formed from a single piece of material or in that the sample vessel 12 is formed from a plurality of pieces that are interconnected to form a unified whole.

As shown in FIGS. 4-8, the sample vessel 12 may comprise a single substrate 60 bound by the outer surface 20 and having the microchannel 22 within the single substrate 60 and the first port 24 and the second port 26 fluidly connected to the microchannel 22 and extending to the outer surface 20. For example, the sample vessel 12 may be a three dimensional printed substrate (e.g., glass substrate and/or plastic substrate). The three dimensional printed substrate may be printed to include the microchannel 22, the first port 24, and the second port 26.

Figure 9:
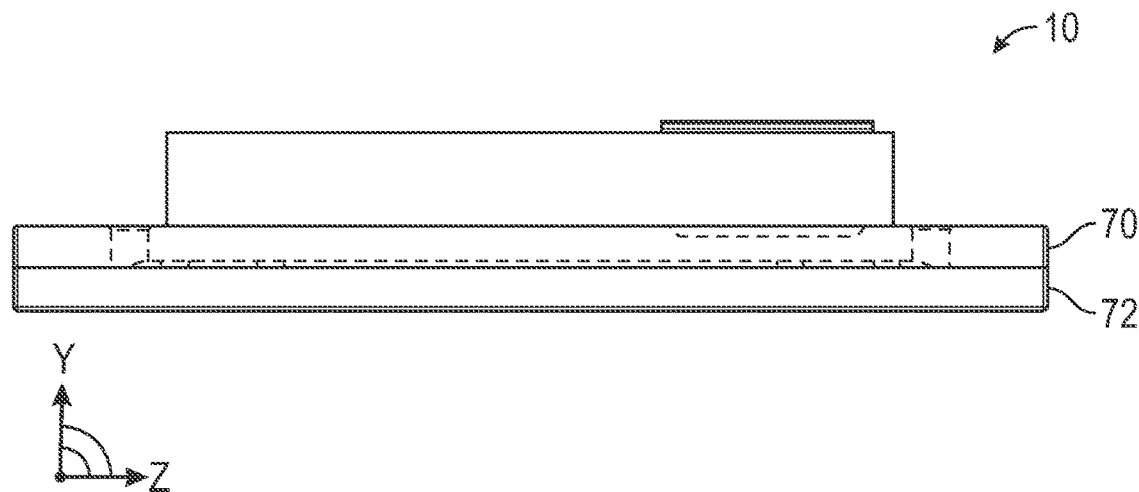
FIG. 9 is a first side elevation view of another exemplary acoustophoretic lysis device in accordance with the present disclosure.

FIG. 9 illustrates another exemplary embodiment of the lysis device 10 wherein the sample vessel 12 may comprise a plurality of substrates. For example, as shown in FIG. 9, the sample vessel 12 comprises a first substrate 70 and a second substrate 72. The second substrate 72 may be layered with the first substrate 70 so as to form a monolithic structure. The plurality of substrates may be annealed, thermal-plasma bonded, and/or the like to each other. For example, in FIG. 9, the first substrate 70 and the second substrate 72 may be annealed to one another. In some embodiments, the first substrate 70 and the second substrate 72 have the same length to width aspect ratio as the sample vessel 12.

The microchannel 22, the first port 24 and/or the second port 26 may be positioned in one or more of the plurality of substrates. For example, in FIG. 9, the microchannel 22 may be positioned in the first substrate 70, the second substrate 72, and/or be formed partially in the first substrate 70 and partially in the second substrate 72. In some embodiments, the microchannel 22, the first port 24, and the second port 26 may be positioned in the first substrate 70. In some embodiments, the microchannel 22 may be etched into the first substrate 70 and/or the second substrate 72. In some embodiments, the microchannel 22 may be positioned in the first substrate 70 and one or both of the first port 24 and the second port 26 may be positioned in the second substrate 72. In some embodiments, one or both of the first port 24 and the second port 26 may be positioned in (and/or extend through) the first substrate 70 and/or the second substrate 72.

Figure 10:
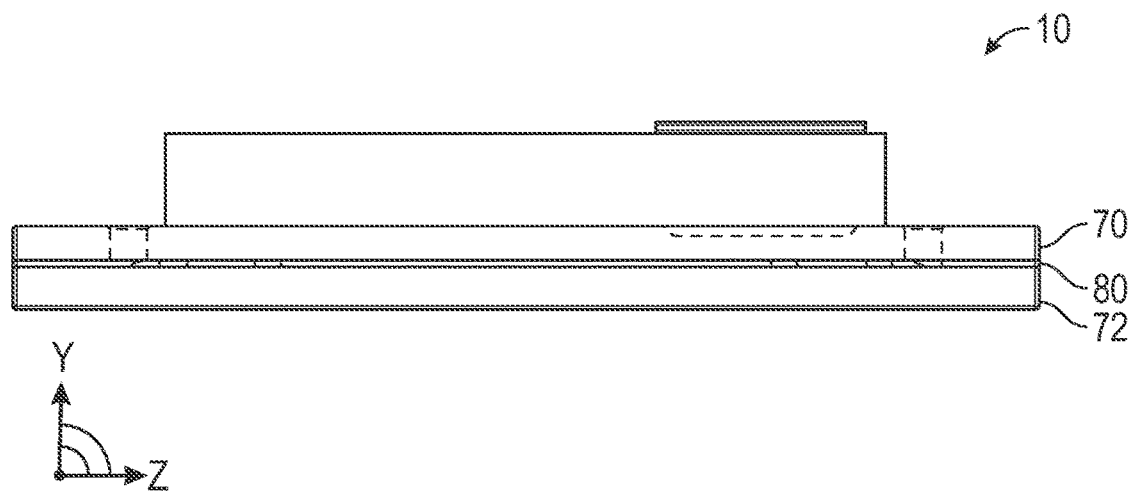
FIG. 10 is a first side elevation view of yet another exemplary acoustophoretic lysis device in accordance with the present disclosure.
Figure 11:
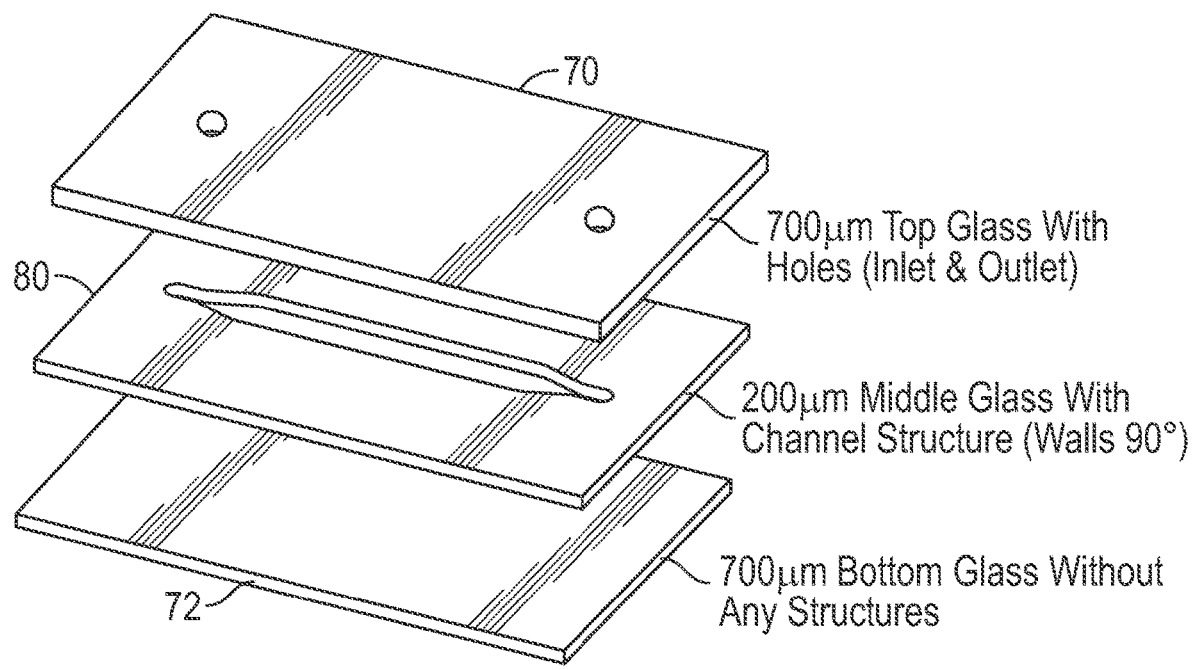
FIG. 11 is a perspective view of components of an exemplary sample vessel in accordance with the present disclosure.

Referring to FIGS. 10 and 11, in some embodiments, the sample vessel 12 may comprise the first substrate 70, the second substrate 72, and a third substrate 80 between the first substrate 70 and the second substrate 72. In some embodiments, the first substrate 70, the second substrate 72, and the third substrate 80 may be layered so as to form a monolithic structure. In some embodiments, the first substrate 70, the second substrate 72, and the third substrate 80 may be thermal-plasma bonded to one another. In some embodiments, the first substrate 70, the second substrate 72, and the third substrate 80 may be annealed to one another. One or both of the first port 24 and the second port 26 may be positioned in the first substrate. The microchannel 22 may be positioned in the second substrate 72. In some embodiments, the microchannel 22 may be a slot positioned through the third substrate 80. In some embodiments, the third substrate 80 may have about the same thickness as the height of the microchannel 22. In some embodiments, the third substrate 80 may be about 100 micrometers thick.

Figure 1B:
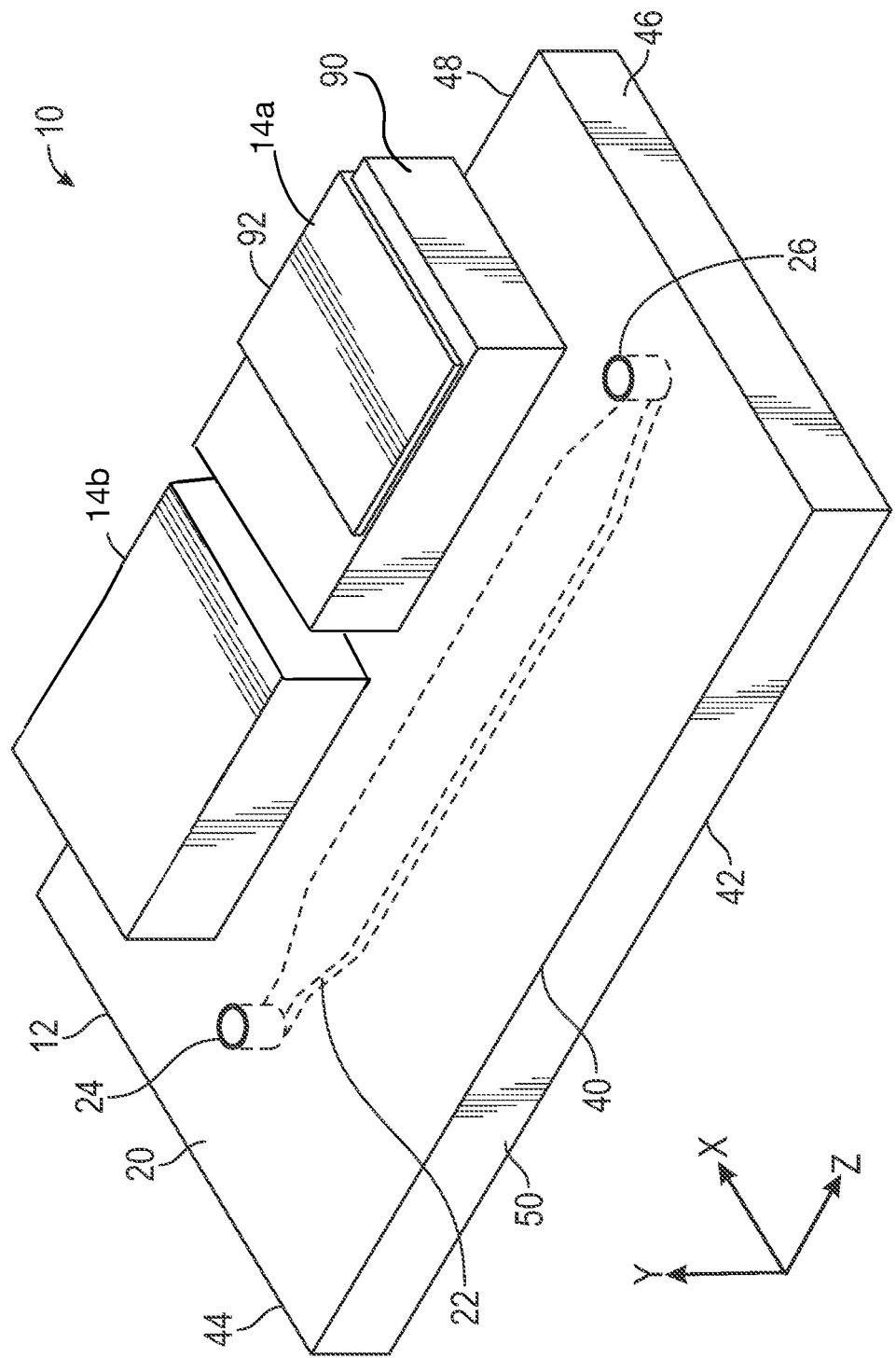
FIG. 1B is a perspective view of another exemplary acoustophoretic lysis device in accordance with the present disclosure.
Figure 2:
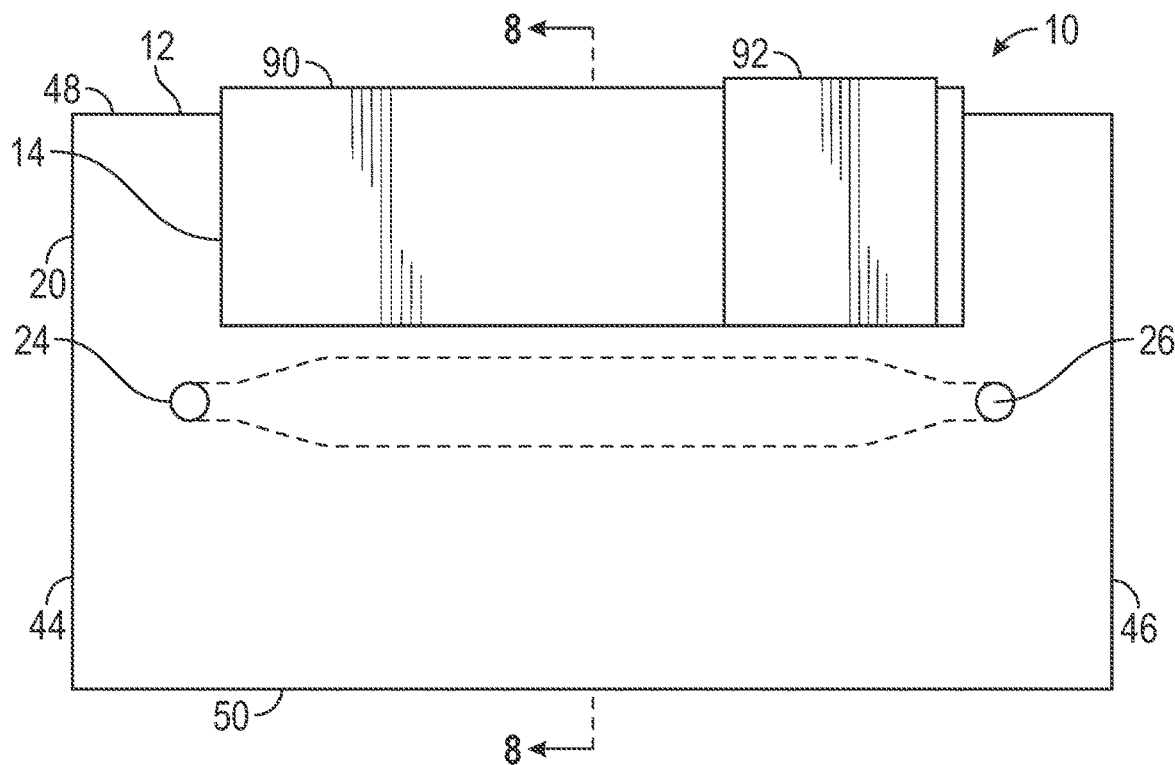
FIG. 2 is a top plan view of an acoustophoretic lysis device in accordance with the present disclosure.
Figure 3:
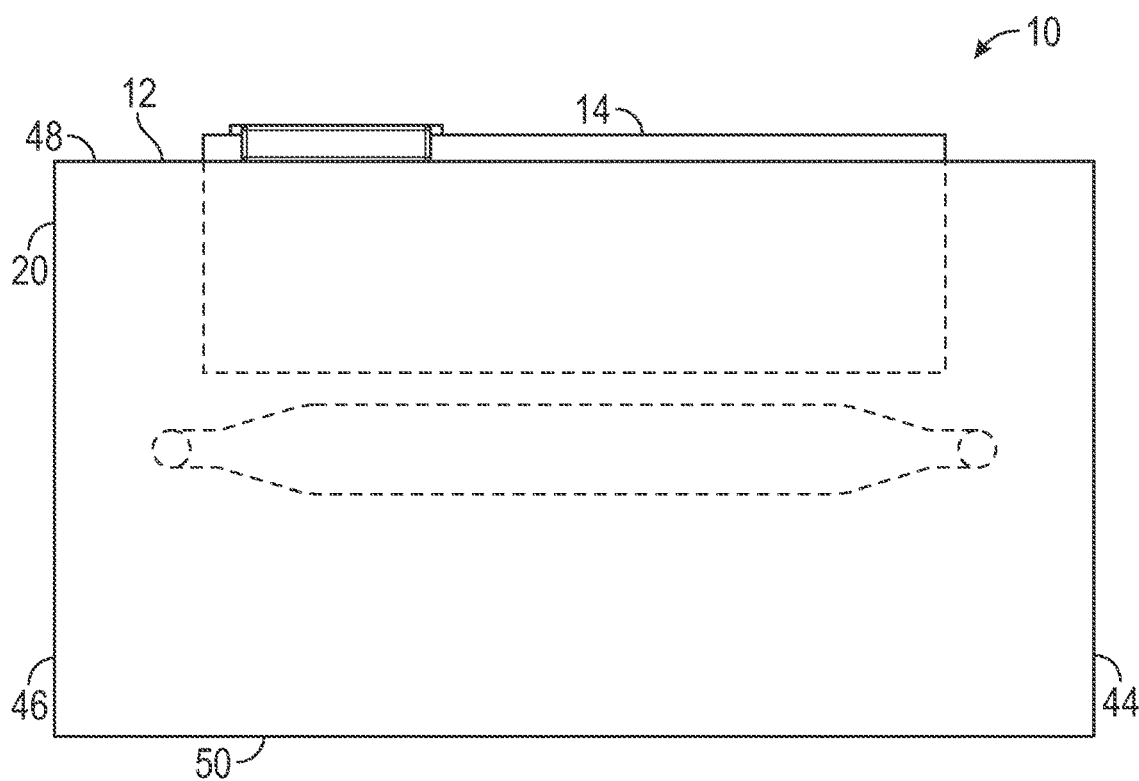
FIG. 3 is bottom plan view of an acoustophoretic lysis device in accordance with the present disclosure.
Figure 4:
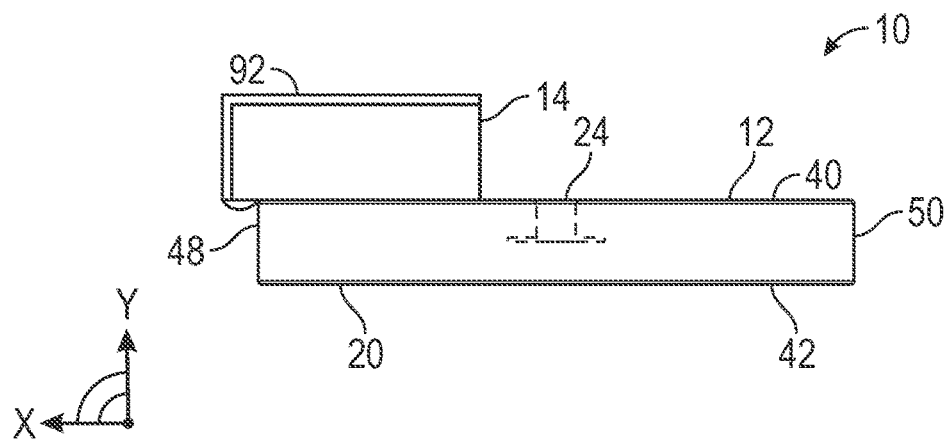
FIG. 4 is a first end elevation view of an acoustophoretic lysis device in accordance with the present disclosure.
Figure 5:
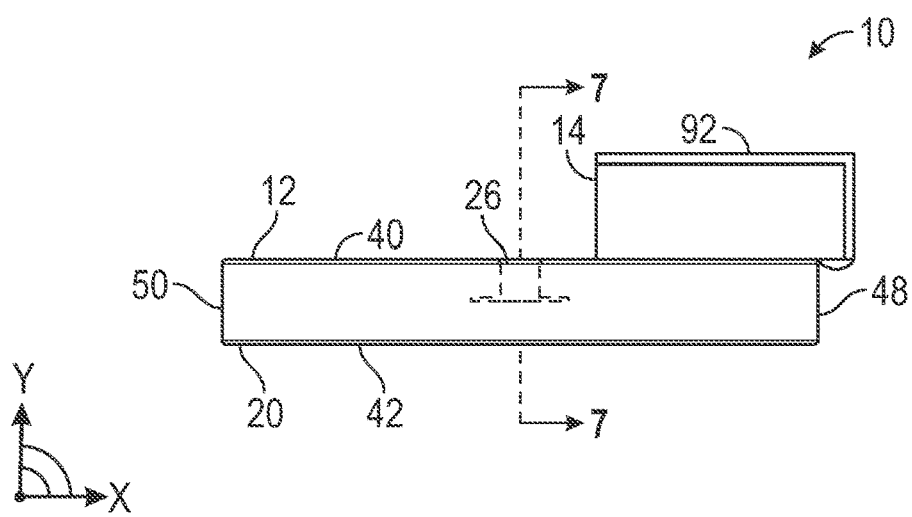
FIG. 5 is a second end elevation view of an acoustophoretic lysis device in accordance with the present disclosure.
Figure 6:
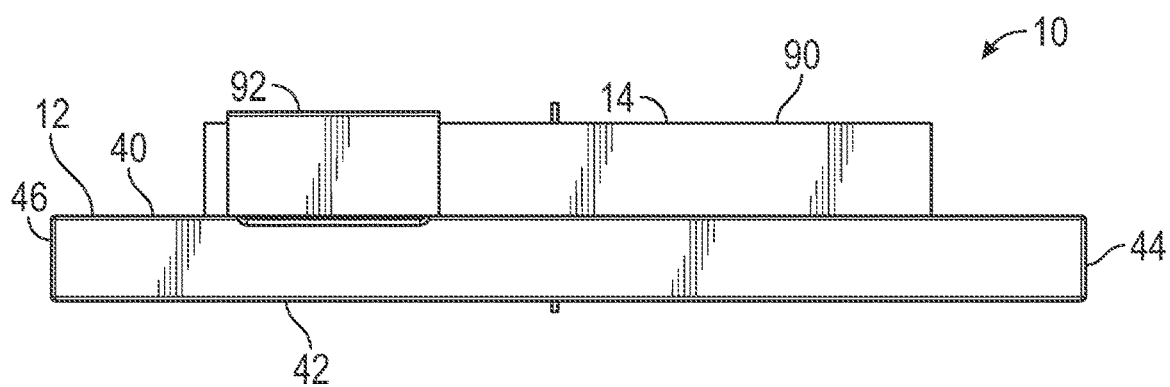
FIG. 6 is a first side elevation view of an acoustophoretic lysis device in accordance with the present disclosure.
Figure 7:
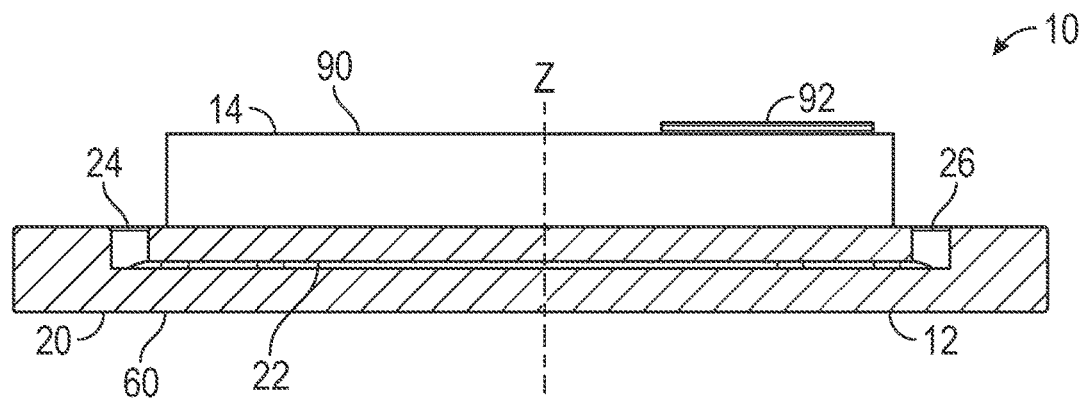
FIG. 7 is a cross-sectional view of an exemplary acoustophoretic lysis device in accordance with the present disclosure.
Figure 8:
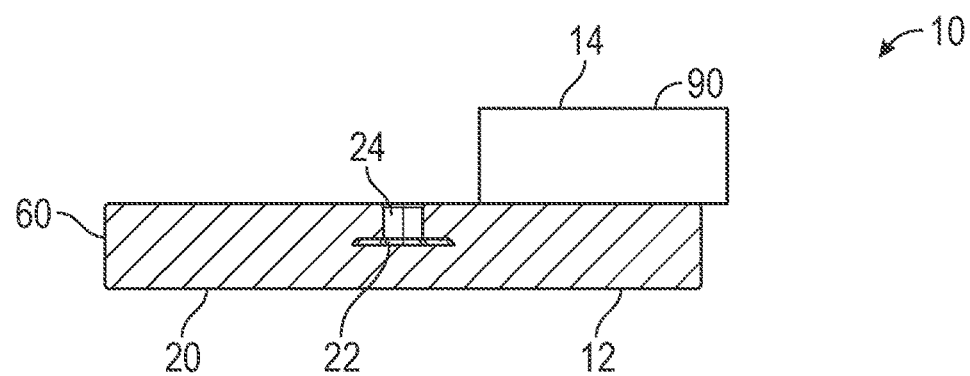
FIG. 8 is a cross-sectional view of an exemplary acoustophoretic lysis device in accordance with the present disclosure.

Referring to FIGS. 1A and 1B, in some embodiments the at least one piezo element 14 may be a single piezo element mounted to the sample vessel 12 as shown in FIG. 1A. In some embodiments, the at least one piezo element 14 may include a plurality of piezo elements 14. For example, in FIG. 1B, a first piezo element 14a and a second piezo element 14b are mounted to the sample vessel 12. The first piezo element 14a may be configured as an acoustic transducer and the second piezo element 14b may be configured as a sensor as described in further detail herein. In some embodiments, the element 14b need not be a piezo element and may be any type vibration sensor (e.g., accelerometer) in accordance with the present disclosure. It should be noted that multiple sensors configured to measure vibration may be used to determine frequency response, for example. The following description provides for the at least one piezo element 14 to include embodiments of a single piezo element 14 and embodiments including a plurality of piezo elements (e.g., the first piezo element 14a and the second piezo element 14b) unless explicitly stated otherwise.

In some embodiments, the at least one piezo element 14 may be mounted to the sample vessel 12 to form the monolithic structure of the lysis device 10. For example, in some embodiments, the at least one piezo element 14 may be mounted to the mounting area of the outer surface 20 as shown in FIGS. 1A and 1B. In some embodiments, at least a portion of the least one piezo element 14 may be mounted to the mounting area of the outer surface 20. In some embodiments, the at least one piezo element 14 may have one or more mounting areas configured for mounting to the mounting area of the outer surface 20. In some embodiments, the at least one piezo element 14 may be mounted at least partially to the top 40 of the sample vessel 12; however, it will be understood that one or more portions of the at least one piezo element 14 may be mounted to the top 40, the bottom 42, the first end 44, the second end 46, the first side 48, and/or the second side 50.

The at least one piezo element 14 may be configured and/or positioned in relation to the microchannel 22 such that it does not block light from moving through the microchannel 22 from the top or the bottom of the sample vessel 12. For example, at least a portion of the at least one piezo element 14 may be offset from the microchannel 22 such that the at least one piezo element 14 or a portion of the at least one piezo element 14 is configured to allow light to enter the microchannel 22 from outside of the sample vessel 12. In some embodiments, the at least one piezo element 14 has a length $L_P$ and has a longitudinal axis along the length $L_P$ that is orientated substantially parallel to the longitudinal axis of the sample vessel 12. The at least one piezo element 14 may include a plurality of piezo elements with each piezo element 14 being substantially similar in design of length $L_P$, width $w_P$ and/or height $h_P$, different in design in length $L_P$, width $w_P$ and/or height $h_P$, or a combination thereof. In some embodiments, the at least one piezo element 14 may be configured having width $w_P$ that is smaller than the length $L_P$ of the at least one piezo element 14.

Depending on design considerations, the at least one piezo element 14 may be positioned on the opposite side from one or both of the first port 24 and the second port 26 or on the same side as one or more of the first port 24 and the second port 26 on the sample vessel 12. In some embodiments, the at least one piezo element 14 may include a plurality of piezo elements (e.g., 14a and 14b of FIG. 1B) with at least one positioned on the opposite side from one or both of the first port 24 and the second port 26 of the sample vessel 12, at least one positioned on the same side from one or both of the first port 24 and the second port 26 of the sample vessel 12, or combinations thereof.

In some embodiments, the at least one piezo element 14 or at least a portion of the at least one piezo element 14 may be affixed or attached to the sample vessel 12. For example, in some embodiments, the at least one piezo element 14 or at least a portion of the at least one piezo element 14 may be bonded or spring loaded to at least a portion of the sample vessel 12. Bonding may include a bond layer, for example, having a thickness less or substantially less than the height of the at least one piezo element 14 and/or the sample vessel 12. In some embodiments, the at least one piezo element 14 may be affixed to at least a portion the sample vessel 12 with an adhesive, for example. The adhesive may be configured to allow acoustic wave propagation with low losses of acoustic waves.

In some embodiments, a fluid adhesive (e.g., liquid adhesive) may be applied to at least a portion of the at least one piezo element 14. At least a portion of the at least one piezo element 14 may be adhered to the sample vessel 12 via the liquid adhesive. The liquid adhesive may have temperature stability of up to about 350° C., configured to have excellent adhesive force on glass, configured for applied high hardness (rigidity), configured to provide for ultrasound propagation, a shore D hardness of about 85, or combinations thereof. An exemplary liquid adhesive may include, but is not limited to, epoxy glue, such as EPO-TEK 353ND distributed by Epoxy Technology, Inc., having a principle place of business in Billerica, MA. Amount of liquid adhesive (e.g., 5 μl) may depend on design considerations. In some embodiments, the at least one piezo element 14 may be clamped to the sample vessel 12 and the liquid adhesive cured (e.g., at approximately 150° C.). In some embodiments, after curing, the thickness of the adhesive may be approximately 100 μm.

In some embodiments, the at least one piezo element 14 may serve as an acoustic transducer and may be configured to convert an electrical charge into another form of energy, such as sound waves having one or more frequency and/or a range of frequencies. To that end, the at least one piezo element 14 may be configured to oscillate when alternating current is applied to the at least one piezo element 14, thereby creating the sound waves that are introduced into the sample vessel 12. The sound waves from the at least one piezo element 14 may create one or more acoustic node within the blood sample 52 in the sample vessel 12. As shown in FIG. 1, the at least one piezo element 14 may comprise a first electrode 90 and a second electrode 92 configured to connect with an alternating current source. In some embodiments, the at least one piezo element 14 may be a piezoelectric ultrasonic transducer.

In some embodiments, the at least one piezo element 14 may be a single piezo element 14 configured to create sound waves capable of being introduced into the sample vessel 12 to create one or more acoustic nodes. Additionally, the single piezo element 14 may be configured to serve as a sensor configured to receive and measure vibration created by the sample vessel 12 in response to the sound waves generated by the single piezo element 14. In some embodiments, the at least one piezo element 14 may be a plurality of piezo elements wherein at least one piezo element 14a, for example, may be configured to create sound waves capable of being introduced into the sample vessel 12 to create one or more acoustic nodes and at least one piezo element 14b, for example, may be configured to serve as a sensor to receive and measure vibration created by the sample vessel 12 in response to the sound waves generated by the piezo element 14a. In some embodiments, each piezo element 14a and 14b may be configured to create sound waves capable of being introduced into the sample vessel 12 to create one or more acoustic nodes and each piezo element 14*a* and 14*b* may also serve as a sensor to receive and measure sound waves created by the sample vessel 12.

Figure 12:
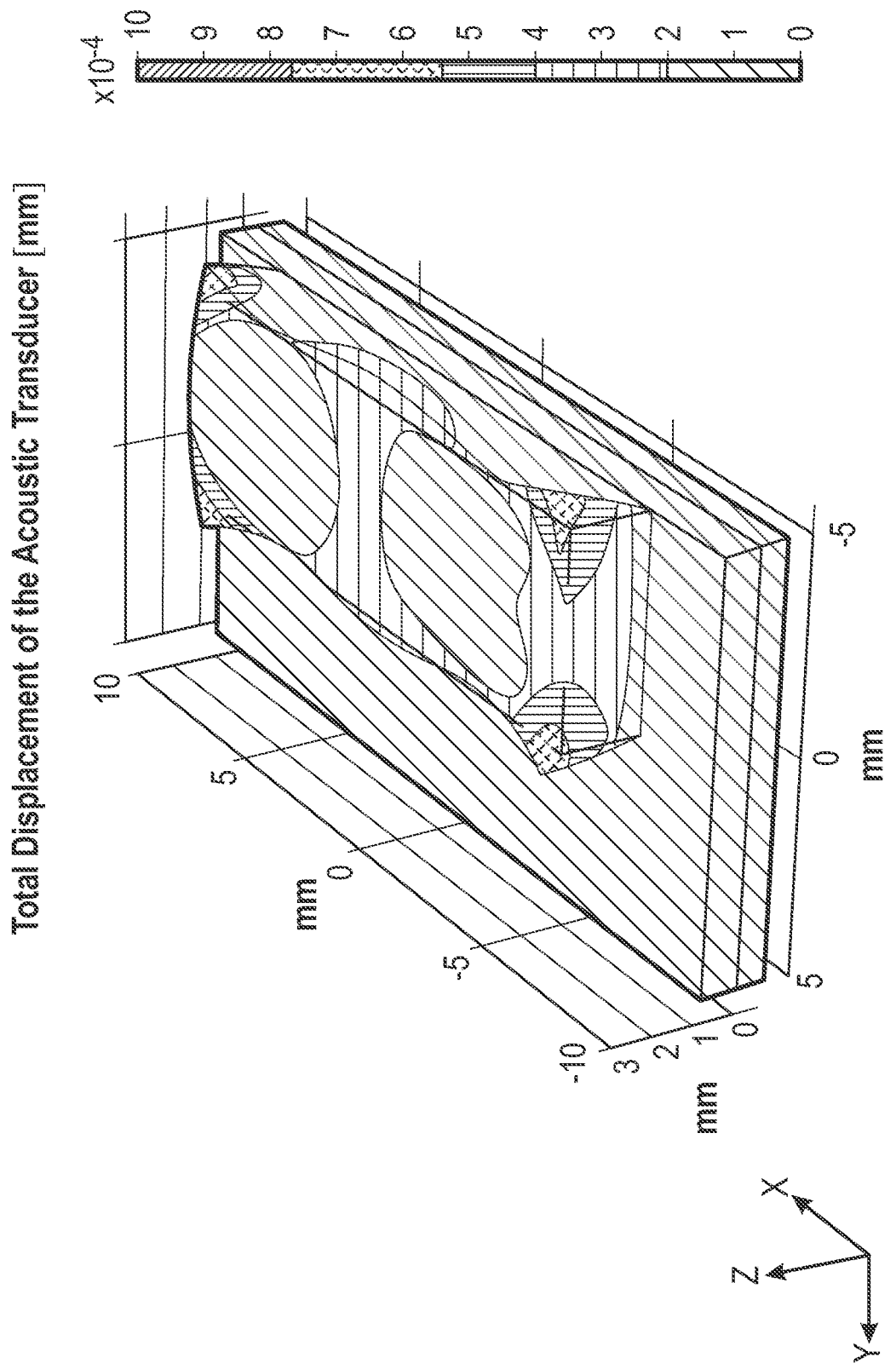
FIG. 12 is a graphical representation of total displacement of an exemplary lysis device in accordance with the present disclosure.

The at least one piezo element 14 serving as an acoustic transducer may be configured to generate ultrasonic activity, producing sound waves with frequencies, by expanding and contracting when electrical frequency and voltage is applied. FIG. 12 shows a graphical representation of one example of the total displacement of the at least one piezo element 14 in an exemplary operation of the at least one piezo element 14 serving as an acoustic transducer.

In some embodiments, the at least one piezo element 14 in serving as an acoustic transducer may be configured to produce ultrasonic sound waves having a resonant frequency that resonates in the blood sample 52 in the microchannel 22 of the sample vessel 12 such that walls of red blood cells in the blood sample 52 are ruptured. In some embodiments, the at least one piezo element 14 in serving as an acoustic transducer, may be configured to produce ultrasonic sound waves (which may also be referred to herein as ultrasonic acoustic waves) having a frequency that causes cavitation in the blood sample 52, thereby rupturing the walls of the red blood cells.

In some embodiments, the at least one piezo element 14 has a first resonant frequency and the monolithic structure of the lysis device 10 has a second resonant frequency spaced spectrally from the first resonant frequency, the second resonant frequency being a frequency of sound waves that is generated by the at least one piezo element 14 and introduced into the sample vessel 12 thereby causing cavitation in the blood sample 52, thereby rupturing the walls of the red blood cells.

Figure 13:
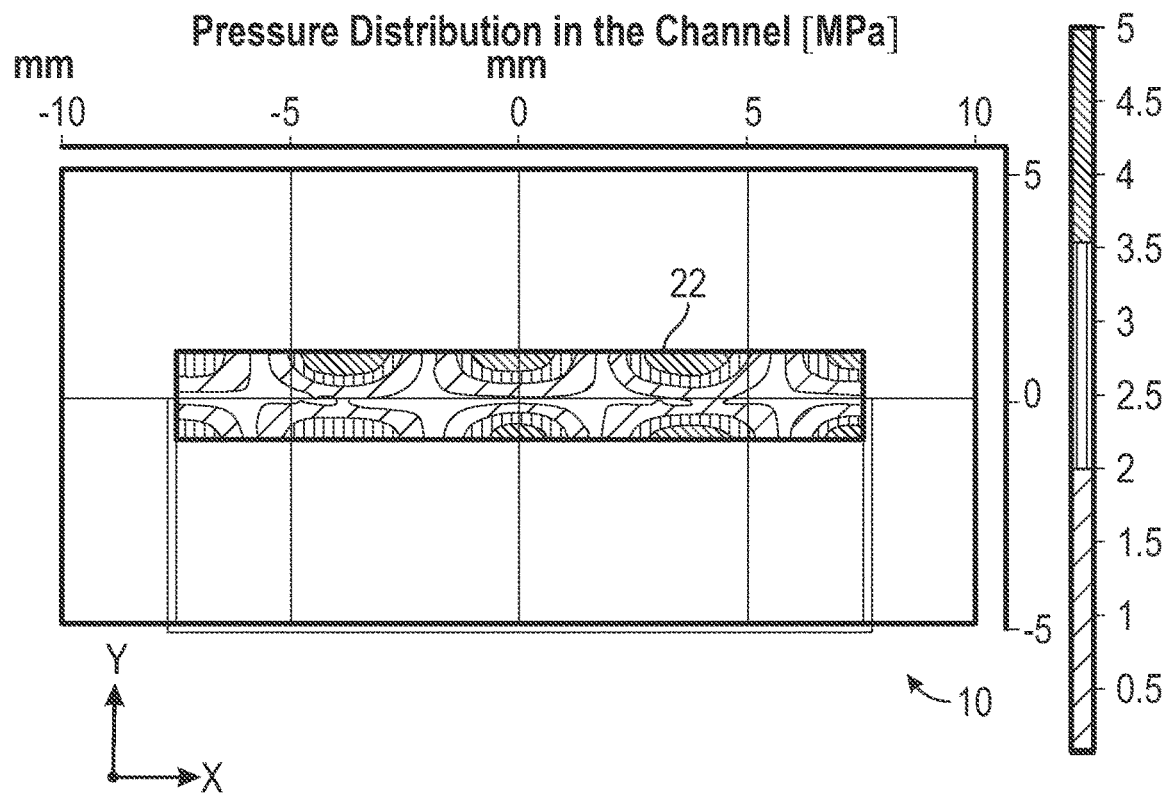
FIG. 13 is a plan view of pressure distribution in a microchannel of an exemplary sample vessel in accordance with the present disclosure.
Figure 14:
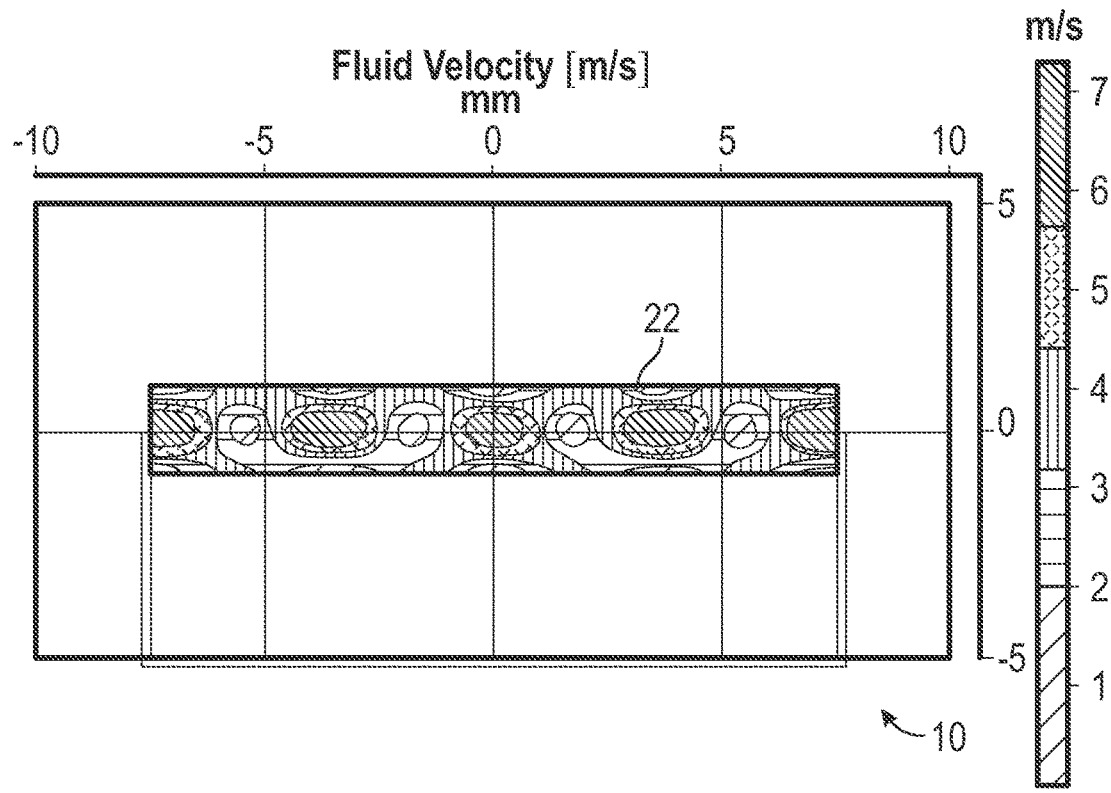
FIG. 14 is a plan view of fluid velocity in a microchannel of an exemplary sample vessel in accordance with the present disclosure.
Figure 15:
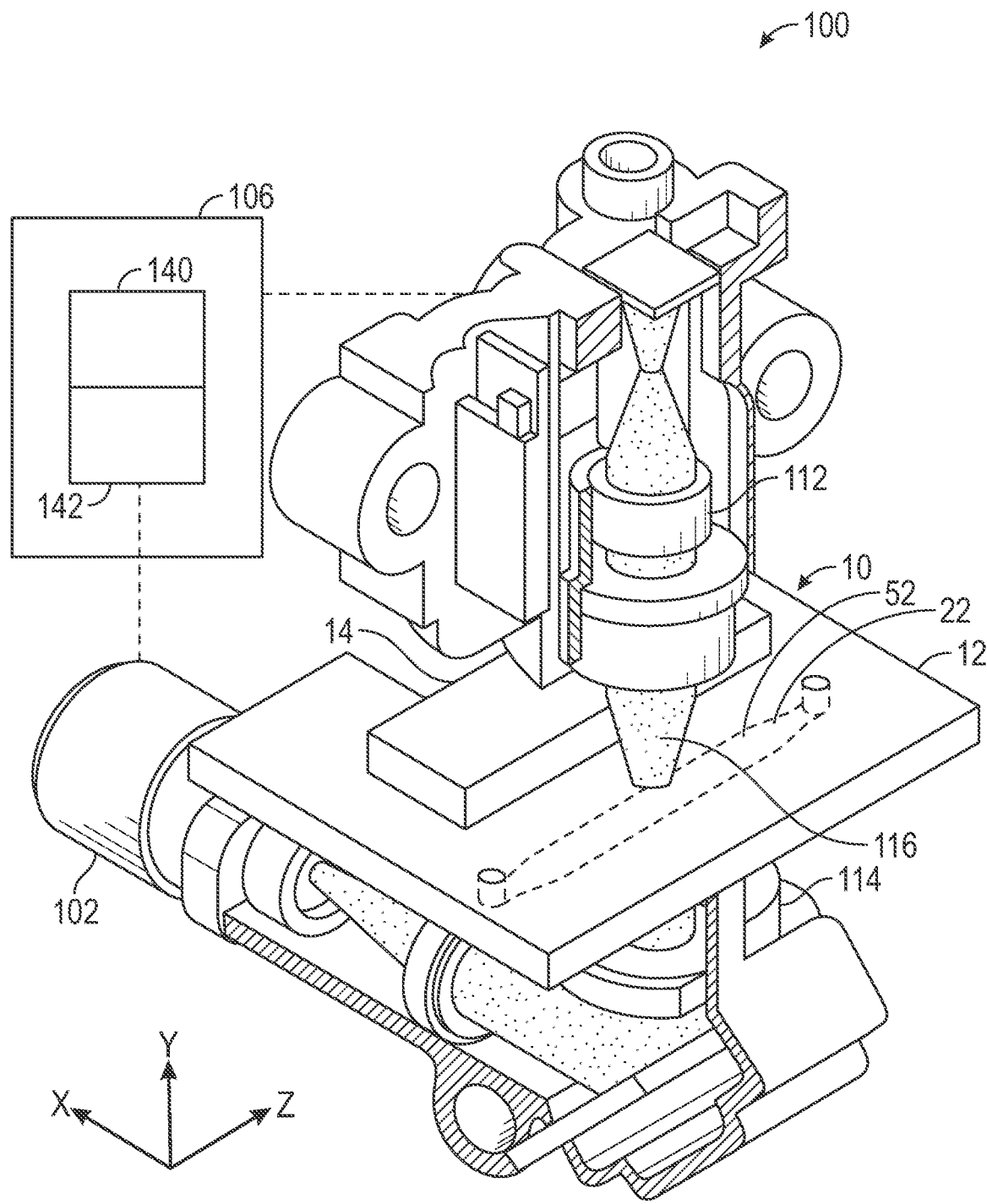
FIG. 15 is a perspective view of an exemplary analyzer in accordance with the present disclosure.

In some embodiments, the second resonant frequency may cause one or more acoustic standing wave, which may form in regions (referred to as nodes) having approximately zero force and approximately no particle movement and the highest hydraulic pressure in the microchannel 22, inside the microchannel 22 of the sample vessel 12 such that walls of red blood cells in the blood sample 52 are ruptured, as illustrated in FIGS. 13 and 14. An acoustic standing wave, also known as a stationary wave, is a wave that oscillates in time, but that has a peak amplitude profile that does not move in space.

In some embodiments, the at least one piezo element 14, as a single piezo element, may be configured to generate sound waves, and additionally, measure the resulting sound wave produced by the sample vessel 12. In some embodiments, the at least one piezo element 14 may be a plurality of piezo elements with at least one piezo element configured to generate the acoustic sound wave and at least one piezo element configured to measure the resulting sound wave produced by the sample vessel 12.

In some embodiments, the lysis device 10 may include the sample vessel 12 bonded to at least a portion of the at least one piezo element 14. The sample vessel 12 may be formed of glass and/or the like. The microchannel 22 may have width $w_M$ of approximately two millimeters with an aspect ratio of 0.05 to 0.125. The sample vessel 12 may have a width $w_{SV}$ of approximately twelve millimeters with an aspect ratio of 1.4 to 1.9. The at least one piezo element 14 may be configured to produce ultrasonic sound waves in the range of 330 kHz to 350 kHz with peak pressure within the microchannel 22 of five MPa (as shown in FIG. 13), and peak velocity up to eight m/s (as shown in FIG. 14). FIGS. 13 and 14 illustrate an exemplary pressure distribution (FIG. 13) and exemplary fluid velocity (FIG. 14) of the blood sample 52 in the microchannel 22 when the at least one piezo element 14 is activated.

The width of the microchannel 22 may be determined based at least on acoustic wave propagation speed inside the blood sample 52 (for example, approximately 1500 m/s) and using the predetermined desired number of acoustic nodes as one node in the middle of the microchannel 22, such that the frequency is approximately 330 kHz to approximately 350 kHz. EQ. 1 may be used to determine, at least in part, a first acoustic node inside the microchannel 22 (with an exemplary 2000 μm width and 100 μm depth), without considering any minor reflection or other mirroring:

$$2f = \frac{v}{\lambda} \quad \text{(EQ. 1)}$$

wherein f is the frequency, v the wave speed in fluid and λ the wavelength (e.g., wavelength λ is ½ of the width of the microchannel 22).

Ultrasonic sound waves inside the microchannel 22 and/or the at least one piezo element 14 may produce undesired heat in the system and/or undesired heat in the blood sample 52 in the microchannel 22. To avoid overheating of the system and/or blood sample 52, the at least one piezo element 14 may be operated to produce ultrasonic sound waves at a particular frequency for a predetermined period of time t. For example, the at least one piezo element 14 may be operated to generate sound waves having the second resonant frequency for between approximately one second and approximately two seconds. In some embodiments, the at least one piezo element 14 may be operated to generate sound waves having the second resonant frequency for less than approximately one and a half seconds. For example, the lysis device 10 may be configured to operate the at least one piezo element 14 as an acoustic transducer for equal to or less than 1.5 seconds to result in 99.99% red blood cell lysis. In one example, the lysis device 10 may be configured to operate the at least one piezo element 14 as an acoustic transducer for approximately ten seconds or less.

In some embodiment, the ultrasonic sound waves inside the microchannel 22 disrupt the blood cells and cell walls into fine particles which produce less light scattering during optical measurement of the blood sample 52 than larger particles.

In some embodiments, the at least one piezo element 14 performing as an acoustic transducer may be configured to produce ultrasonic sound waves in a range of frequencies and the second resonant frequency may be within the range of frequencies.

In some embodiments, the at least one piezo element 14 may be configured to produce ultrasonic sound waves in a range of frequencies that is greater than approximately 300 kHz. In some embodiments, the at least one piezo element 14 may be configured to measure sound waves in a range of frequencies that is greater than approximately 300 kHz.

The resonant frequency, and/or the frequency range, may be determined based on one or more factors including the size, shape, and material of the sample vessel 12; the size and shape of the microchannel of the sample vessel 12; the amount of fluid in the blood sample 52; and/or the size, shape, and material of the at least one piezo element 14.

For example, when the sample vessel 12 is made of glass, the microchannel 22 has an aspect ratio of approximately 0.05 to approximately 0.125, and the sample vessel 12 has an aspect ratio of approximately 1.4 to approximately 1.9, the at least one piezo element 14 may be configured to produce ultrasonic sound waves in the range of approximately 330 kHz to approximately 350 kHz. In some embodiments, the at least one piezo element 14 may also be configured to measure ultrasonic sounds waves in the range of approximately 330 kHz to approximately 350 kHz.

Figure 21:
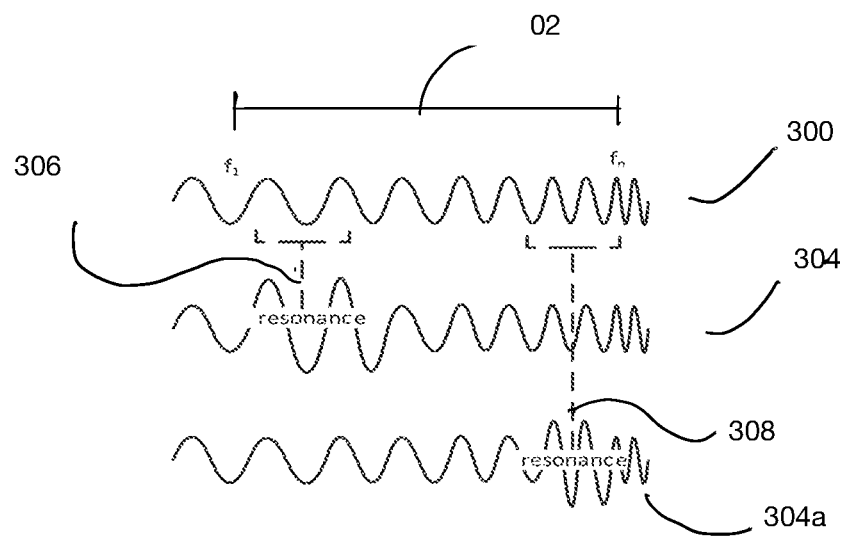
FIG. 21 illustrates a frequency sweep of a first signal generated by a piezo element and a resulting second signal from vibration of a first sample vessel and a resulting second signal from vibration of a second sample vessel.

Referring to FIGS. 1A, 1B and 21, in some embodiments, resonant frequency for the sample vessel 12 and/or blood sample 52 may be determined to calibrate the sound waves generated by the at least one piezo element 14. For example, in some embodiments, the at least one piezo element 14 may generate a first signal 300 of ultrasonic acoustic standing waves at a first frequency sweep 302 driven from frequency $f_1$ to frequency $f_n$ for a first duration of time t to the sample vessel 12. The first frequency sweep 302 is a frequency sweep range that may cover configuration tolerances. For example, the first frequency sweep 302 may be in a range of approximately 40-50 kHz about the known resonance of glass, e.g., 300-350 kHz. In some embodiments, the first frequency sweep 302 may include a range from about 300 kHz to about 350 kHz over a duration of time t of about 5 seconds, for example. In some embodiments, the first frequency sweep 302 may include a range from about 350 kHz to about 360 kHz over a duration of time t of about 5 seconds, for example. In some embodiments, the first signal 300 may be a low drive spectrally pure sine wave, square wave, triangle wave, and/or the like.

The at least one piezo element 14 may then cease to provide the first signal 300 and then subsequently receive a second signal 304 comprising a vibration signal (e.g., from the sample vessel 12) due to the first signal 300. In some embodiments, the at least one piezo element 14 may be a single device configured to both generate the first signal 300 and measure the second signal 302 comprising a vibration signal as illustrated in FIG. 1A and FIG. 21. In some embodiments, the at least one piezo element 14 may be two or more separate devices with at least the first piezo element 14a configured to generate the first signal 300 and at least the second piezo element 14b configured to measure the second signal 304 (e.g., having the vibration signal from the sample vessel 12) as illustrated in FIGS. 1A and 21.

The first signal 300 and the second signal 304 having the vibration signal may be compared to determine resonant frequency of the sample vessel 12, blood sample 52, surrounding environment, lysis device 10 and/or combinations thereof. For example, in FIG. 21, the first signal 300 is provided to the sample vessel 12 and the response second signal 304 is shown below the first signal 300. The second signal 304 illustrates a higher amplitude at a relative maximum 306. The relative maximum 306 indicates the resonant frequency of the lysis device 10, for example. In the sample vessel 12, the optimum frequency for the sound waves generated by the at least one piezo element 14 may include, or exclude the resonant frequency. The determined resonant frequency may be analyzed and used to provide optimum results for rupturing blood cells in the blood sample 52 in the shortest time with the least temperature increase. To that end, the determined resonant frequency may be used to calibrate the signal to be emitted by the at least one piezo element 14 in order to lyse blood cells within the blood sample 52. The at least one piezo element 14 may then emit a calibrated signal using the determined resonant frequency with an intensity and duration to lyse blood cells within the blood sample 52 within the microchannel 22 of the sample vessel 12.

Referring to FIG. 21, in another example using a different sample vessel, the response second signal 304a may have an amplitude at a relative maximum 308 indicating the optimal resonant frequency for use in the system. To that end each sample vessel 12 and/or lysis device 10 may be calibrated based on the determined resonant frequency for use in the lysis device 10 and/or sample vessel 12. Further, each lysis device 10 may be calibrated throughout the life cycle of the lysis device 10. The at least one piezo element 14 may then emit a calibrated signal using the determined resonant frequency with an intensity and duration to lyse blood cells within the blood sample 52 within the microchannel 22 of the sample vessel 12.

Figure 22:
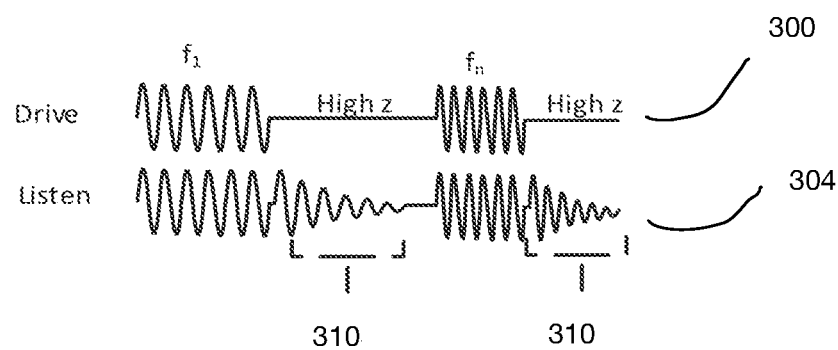
FIG. 22 illustrates a first signal generated by a piezo element and a resulting second signal from vibration of a sample vessel.

FIG. 22 illustrates another exemplary method for determining resonant frequency for calibrating the signal to be used by the at least one piezo element 14. Generally, the at least one piezo element 14 may be driven to emit the first signal 300. The first signal 300 includes a series of frequencies, $F_1$-$F_n$ with an observation period between the emission of each adjacent pair of frequencies. During the observation period(s) the at least one piezo element 14 is not driven, and is maintained at a high Z value. The piezo element 14 produces a second signal 304 indicative of the vibration from the sample vessel 12. In particular, in FIG. 22, the second signal has a decay envelope 310 during each observation period that may be analyzed to determine a resonant frequency of the sample vessel 12. In particular, the decay signals during the observation periods may be compared to determine which frequency $F_1$-$F_n$ provides the strongest signal within the decay envelopes 310, thus indicating which frequency $F_1$-$F_n$ is the resonant frequency of the sample vessel 12. Once the resonant frequency is determined from the decay signal, the at least one piezo element 14 may then be driven with a calibrated signal based on the resonant frequency (e.g., including or excluding the resonant frequency) with an intensity and duration to lyse blood cells within the blood sample 52 within the microchannel 22 of the sample vessel 12.

In some embodiments, the at least one piezo element 14 may be configured to provide the first frequency sweep 302 in a range in steps (e.g., one kHz of frequency). In some embodiments, the at least one piezo element 14 may provide the first frequency sweep 302 without further calibrating the resonant frequency. To that end, the at least one piezo element 14 may provide the first frequency sweep over a particular frequency range such that an estimated resonant frequency may be obtained for the lysis device 10 plus the blood sample 52, even in light of variances in the geometry and materials of the lysis device 10. For example, the at least one piezo element 14 may be configured to sweep the frequency range between approximately 330 kHz and approximately 350 kHz in approximately one kHz steps, less than one kHz steps, or greater than one kHz steps. The at least one piezo element 14 may be configured to provide the first frequency sweep 302 from approximately 330 kHz to approximately 350 kHz and/or the at least one piezo element 14 may be configured to provide the first frequency sweep 302 from approximately 350 kHz to approximately 330 kHz, for example.

In some embodiments, the at least one piezo element 14 may be configured to provide the first frequency sweep 302 in a frequency range over a duration of time t greater than zero seconds, and less than five seconds, less than four seconds, less than three seconds, less than two seconds, and/or less than one second. In some embodiments, the at least one piezo element 14 may be configured to provide the first frequency sweep 302 for a duration of time t between approximately one second and approximately two seconds.

In some embodiments, additionally or alternatively, the lysis device 10 may lyse the blood cells in the blood sample 52 by inducing shear and bending modes in the microchannel 22 of the sample vessel 12. The at least one piezo element 14 (e.g., rigid and/or bonded) may be displaced (e.g., transverse displacement), resulting in vibration and/or movement of the sample vessel 12. For example, when activated, the at least one piezo element 14 may change shape, contracting and/or elongating (e.g., transverse displacement) as shown in FIG. 12. Movement of the at least one piezo element 14 may be translated to the sample vessel 12. Such movement may change the geometry and/or volume of the microchannel 22 inducing shear force and/or bending in the microchannel 22 of the sample vessel 12. FIG. 12 illustrates a graphical representation of exemplary total displacement of the at least one piezo element 14 in an exemplary operation of the at least one piezo element 14.

Displacement of the at least one piezo element 14 may result in bending and/or shear forces within the sample vessel 12. Bending and/or shear forces within the sample vessel 12 may cause and/or contribute to lysis of the blood sample 52 in the microchannel 22 of the sample vessel 12 due to a combination of high pressure, shear forces, and/or fluid movement inside the microchannel 22. To that end, lysis of the blood sample 52 in the microchannel 22 may be caused by a combination of acoustic standing waves, pressure, shear forces, and/or fluid movement within the blood sample 52.

Shear force may be developed at the attachment (e.g., bond) between the at least one piezo element 14 and the sample vessel 12 when the at least one piezo element 14 is activated. The shear stress may result in high pressures inside of the microchannel 22. For example, in some embodiments, pressure may be approximately 5 MPa. In some embodiments, pressure may be in a range of approximately 3 MPa to approximately 7 MPA. In some embodiments, pressure may be controlled by the level of contraction and/or elongation of the at least one piezo element 14. The level of contraction and/or elongation of the at least one piezo element 14 may depend on the electric field strength of the at least one piezo element 14.

The combination of acoustic standing waves inside the microchannel 22 along with shear force and/or bending of the sample vessel 12 may cause cavitation in the blood sample 52 in the microchannel 22. Such cavitation may cause the rupture of the cell walls within the blood sample 52.

Referring now to FIGS. 15-18, in some embodiments, the lysis device 10 may be a component of an analyzer 100. The analyzer 100 may comprise the lysis device 10, an absorbance spectrophotometer 102, a fluidic distribution system 104, and/or a controller 106. In some embodiments, the lysis device 10 is removable and/or exchangeable from the other components of the analyzer 100. In some embodiments, the lysis device 10 is permanently attached to the analyzer 100 with one or more components of the lysis device 10 being removable and/or exchangeable. In some embodiments, the analyzer 100 may further comprise a mount 108 configured to receive and/or position the lysis device 10. In some embodiments, the lysis device 10 may be held (e.g., clamped) within the mount 108 such that the lysis device 10 is able to vibrate and/or move within a range of vibration and/or movement.

In some embodiments, the controller 106 of the analyzer 100 may further comprise one or more processors 140 and one or more non-transitory computer readable medium 142. In some embodiments, the one or more processors 140 and the one or more non-transitory computer readable medium 142 may be part of the controller 106. However, it will be understood that one or more of the processors 140 and/or the non-transitory computer readable medium 142 may be located external to the controller 106 and/or external to the other components of the analyzer 100.

In some embodiments, the absorbance spectrophotometer 102 may comprise a transmitter 112 and a receiver 114 positioned adjacent to the sample vessel 12, the transmitter 112 positioned to emit a medium 116 through the top 40, the bottom 42, and the microchannel 22, and the receiver 114 is positioned to receive at least a portion of the medium 116 after the portion of the medium 116 has passed through the top 40, the bottom 42, and the microchannel 22. In some embodiments, the transmitter 112 may be a light source and the medium 116 may be light. The light source may be, but is not limited to, one or more light emitting diode, one or more tube lights, one or more electric bulbs, sunlight, and/or combinations thereof. For example, in some embodiments, the light source may be one or more light emitting diodes providing white light having wavelengths in a range from approximately 450-700 nanometers.

The absorbance spectrophotometer 102 may be configured to measure the intensity of light in a part of the spectrum, especially as transmitted or emitted by particular substances in the blood sample 52 in the microchannel 22 of the sample vessel 12. The absorbance spectrophotometer 102 may be configured to measure how much a chemical substance absorbs light by measuring the intensity of light as a beam of light passes through the blood sample 52, or other fluidic sample 52. Each compound in the sample or solution absorbs or transmits light over a particular range of wavelengths.

Figure 16:
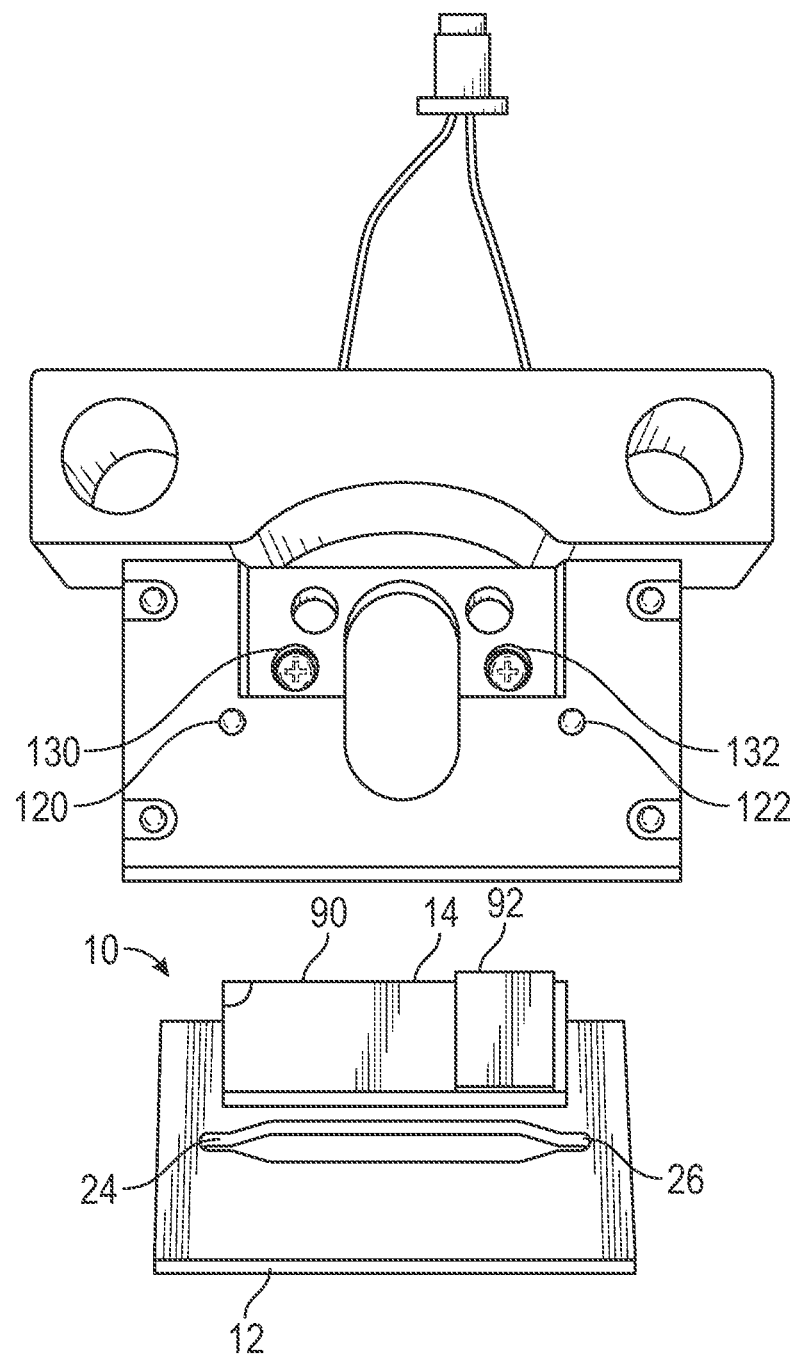
FIG. 16 is a perspective view of components of an exemplary analyzer in accordance with the present disclosure.
Figure 17:
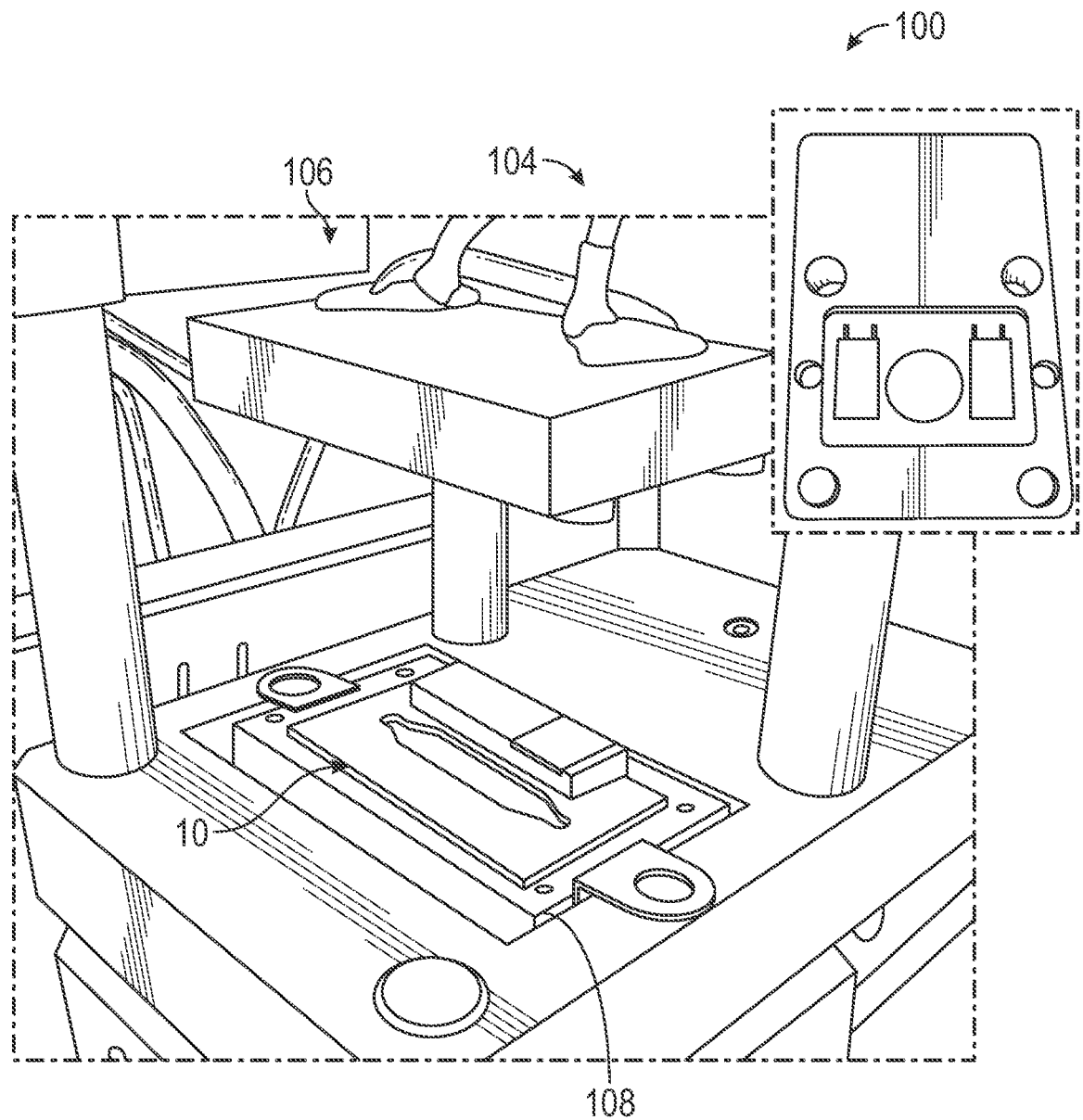
FIG. 17 is a perspective view of components of an exemplary analyzer in accordance with the present disclosure.
Figure 18:
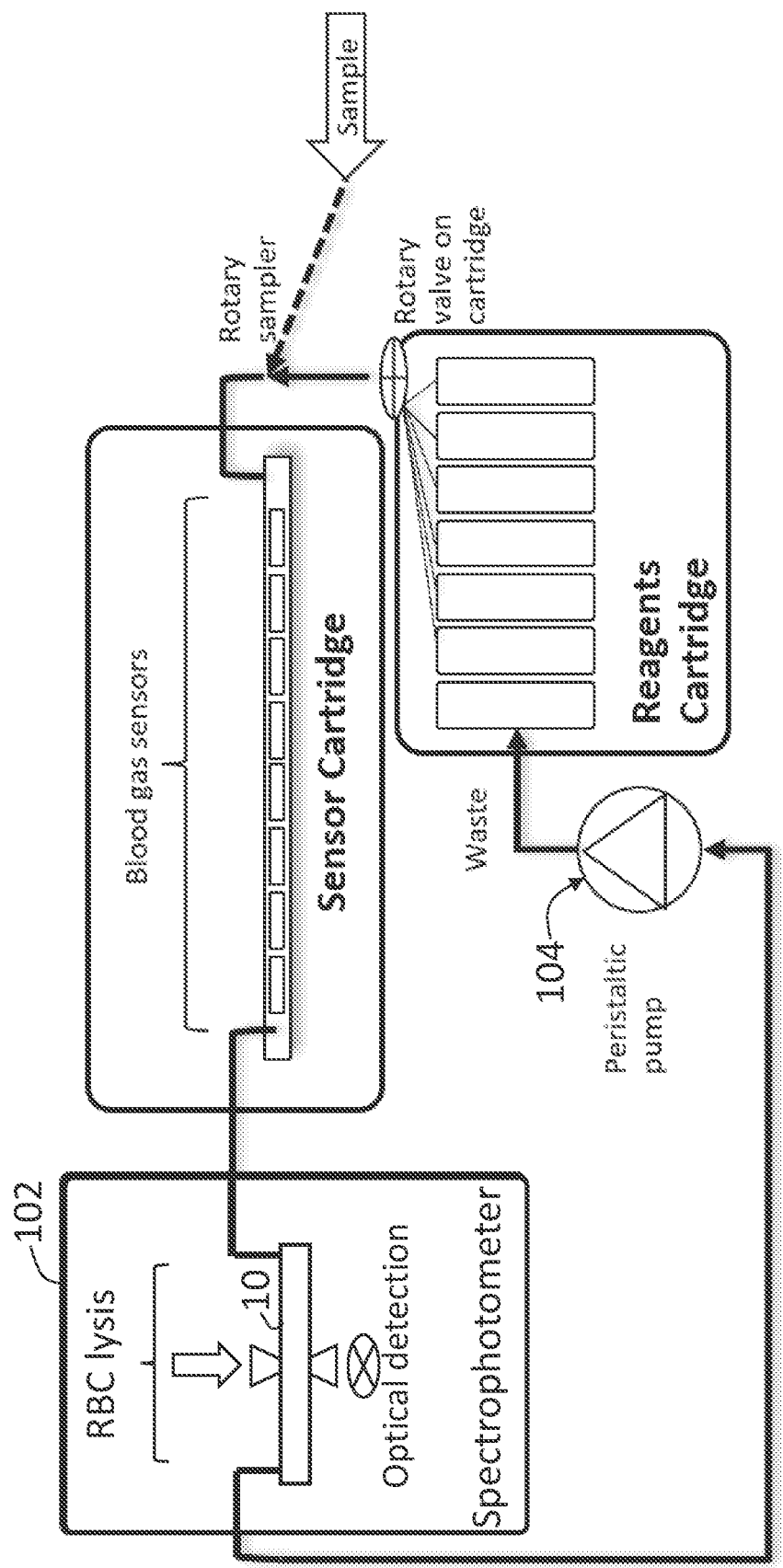
FIG. 18 is a schematic view of components of an exemplary analyzer in accordance with the present disclosure.

Referring to FIGS. 16 and 17, the fluidic distribution system 104 may have an inlet 120 fluidly connectable to the first port 24, and an outlet 122 fluidly connectable to the second port 26 of the sample vessel 12 of the lysis device 10. The fluidic distribution system 104 may move one or more fluidic samples 52, such as a blank sample or a blood sample or a washing solution, through the inlet 120 through the first port 24 into the microchannel 22 of the sample vessel 12. For simplicity in description, blood sample 52 is used throughout the description; although one skilled in the art will appreciate other fluidic samples (e.g., liquid and gas) may be used in accordance with the present disclosure. In some embodiments, the fluidic distribution system 104 may flush the microchannel 22, expelling material within the microchannel 22 through the second port 26 of the sample vessel 12 and out of the outlet 122. The fluidic distribution system 104 may be operated automatically, manually, or a combination of automatically and manually.

The controller 106 may be electrically connected to the at least one piezo element 14 of the lysis device 10. In some embodiments, the controller 106 may be configured to provide signals to the at least one piezo element 14, that when received by the at least one piezo element 14 cause the at least one piezo element 14 to emit ultrasonic acoustic waves at one or more frequency and/or range of frequencies.

Figure 23:
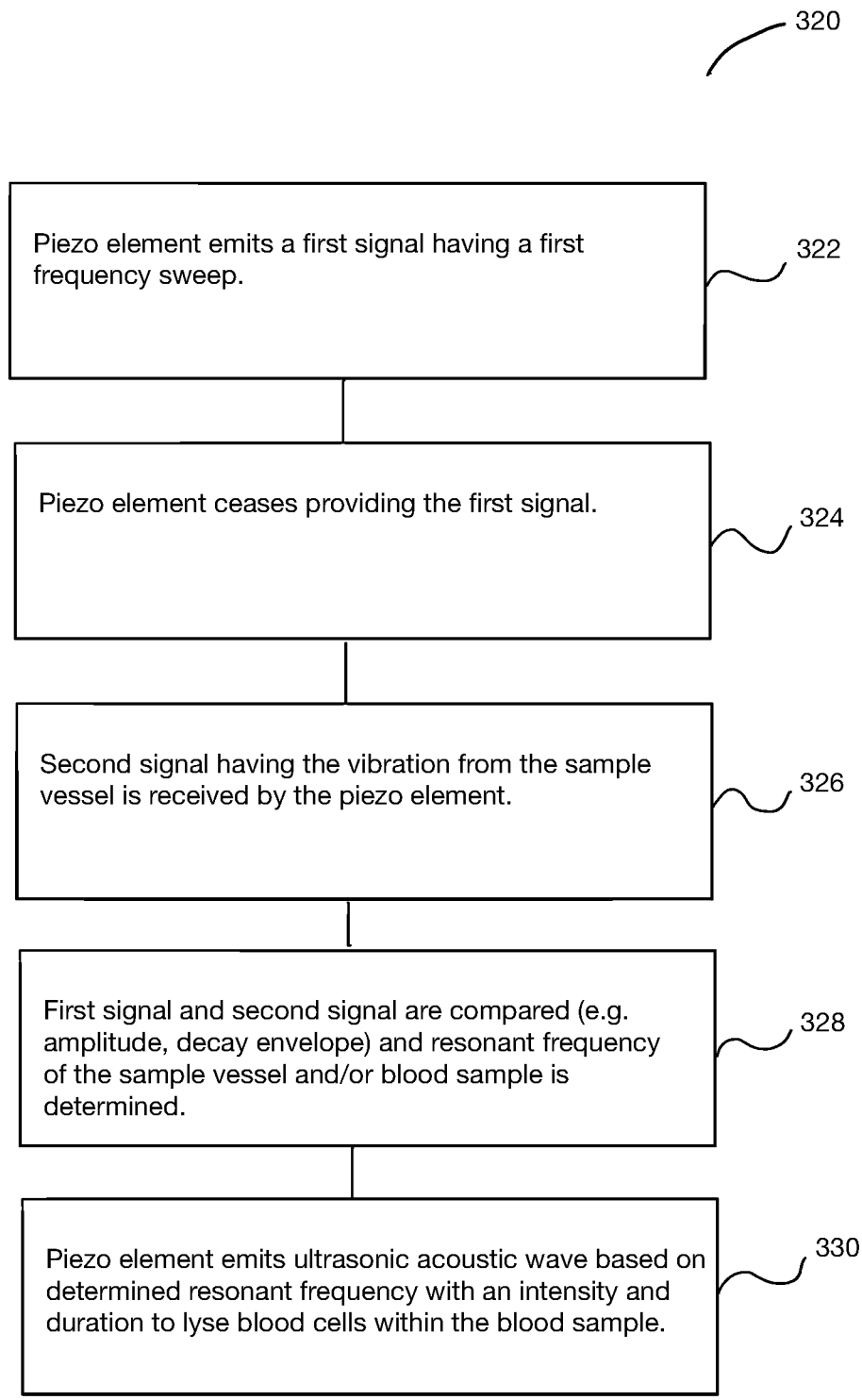
FIG. 23 illustrates a flow chart of an exemplary method of calibrating a piezo element to provide sound waves in accordance with the present disclosure.

FIG. 23 illustrates a flow chart 320 of an exemplary method for calibrating the at least one piezo element 14 to emit ultrasonic acoustic waves. In a step 322, the controller 106 may be configured to provide one or more signals to the at least one piezo element 14 to cause the at least one piezo element 14 to emit a first signal 300 having ultrasonic acoustic waves over a first frequency sweep 302 as shown in FIGS. 21 and 23. In a step 324, the controller 106 may adjust the at least one piezo element to cease providing the first signal 300. In a step 326, the controller 106 may receive the second signal 304 from the at least one piezo element with the second signal 304 comprising the vibration signal (e.g., from the sample vessel 12) resulting from the first signal 300 causing the sample vessel 12 to vibrate. The sample vessel 12 may include the blood sample 52 or be void of the blood sample 52. In a step 328, the controller 106 may compare the first signal 300 with the second signal 304 (e.g., amplitude, decay envelope) and identify within the second signal 304 the resonant frequency. In a step 330, the controller 106 may be configured to provide one or more signals to the at least one piezo element 14 to cause the at least one piezo element 14 to emit ultrasonic acoustic waves based on the determined resonant frequency such that the ultrasonic acoustic waves have an intensity and duration to lyse blood cells within the blood sample 52.

As shown in FIGS. 1A and 16, in some embodiments the controller 106 may have a first electrical contact 130 and a second electrical contact 132. The first electric contact 130 and the second electric contact 132 may be electrically connectable to the first electrode 90 and the second electrode 92, respectively, of the at least one piezo element 14 of the lysis device 10 such that electrical potential may be provided to the at least one piezo element 14.

The mount 108 may hold the lysis device 10 in place between the transmitter 112 and the receiver 114 and may position the lysis device 10 to be operably connected to the fluidic distribution system 104 and the controller 106 (see FIG. 17). The mount 108 may be configured to stabilize the lysis device 10 in position without applying a force that would significantly change the acoustic impedance of the monolithic structure of the lysis device 10. For example, the mount 108 may include one or more clamps that apply a clamping force at or below approximately twenty newtons (N).

In some embodiments, the analyzer 100 may further comprise one or more digital temperature sensors and/or one or more thermal control element (such as Peltier elements).

In some embodiments, analyzing blood may comprise obtaining or receiving a blood sample 52; inputting the lysis device 10 between the transmitter 112 and the receiver 114 of the absorbance spectrophotometer 102; inputting, with the fluidic distribution system 104, the blood sample 52 into the microchannel 22 of the sample vessel 12 via the inlet 120 and first port 24; activating the controller 106 to provide electrical signals to the at least one piezo element 14 to generate a first signal; calibrating the at least one piezo element 14 based on determined resonant frequency by comparing the first signal to a second signal, the second signal having a resulting vibration signal (e.g., received by the at least one piezo element 14 (FIG. 1A), the piezo sensor 14b (FIG. 1B), and/or an external sensor); activating the controller 106 to provide electrical signals to the at least one piezo element 14, that when received by the at least one piezo element 14 cause the at least one piezo element 14 to emit ultrasonic acoustic waves at one or more frequency and/or range of frequencies, based on the determined resonant frequency of the lysis device 10 and/or the blood sample 52, and/or cause the at least one piezo element 14 to elongate and contract thereby producing shear forces in the blood sample 52 in the microchannel 22; such that cavitation is induced in the blood sample 52 causing the walls of the red blood cells of the blood sample 52 to rupture; activating the absorbance spectrophotometer 102 to transmit the medium 116 from the transmitter 112 through the lysed blood sample 52 to the receiver 114.

Further, analyzing blood may comprise reading electrical signals generated by the receiver 114 to determine one or more oximetry parameters of the lysed blood sample 52 based at least in part on a signal indicative of the light received by the receiver 114 of the absorbance spectrophotometer 102.

Figure 19:
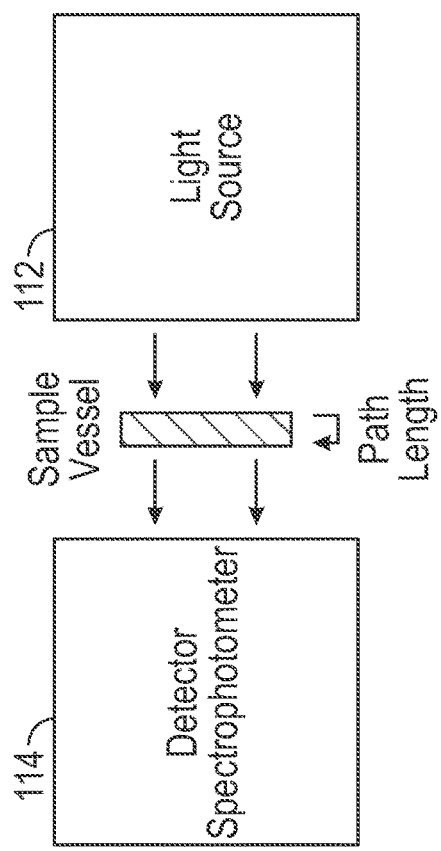
FIG. 19 is a schematic of determination of an absorption spectrum in accordance with the present disclosure.
Figure 20:
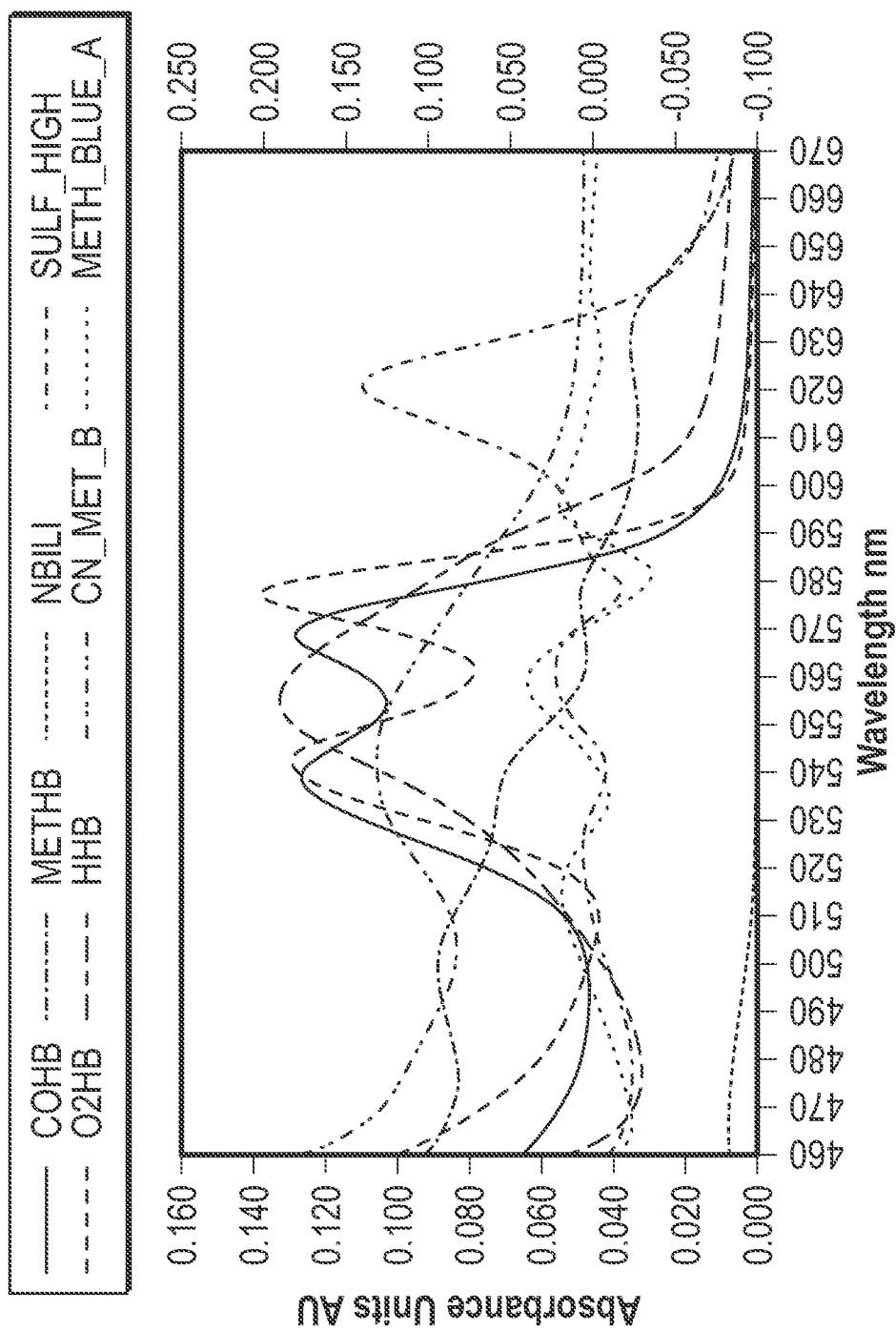
FIG. 20 illustrates spectral profile coefficients of the hemoglobin forms.

As shown in FIG. 19, an absorption spectrum may be calculated based on known calculations for absorption for liquid mediums. Further, as shown in FIG. 20, determining one or more oximetry parameters may further comprise analyzing spectral profile coefficients of hemoglobin forms, such as one or more of the following: carboxyhemoglobin (COHB), oxyhemoglobin (O2HB), methemoglobin (METHB), deoxyhemoglobin (HHB), neonatal Bilirubin (NBILI), Cyan Methemoglobin (CN_MET_B), Sulfhemoglobin (SULF_HIGH), and Methylene blue dye (METH_BLUE_A).

Determining one or more one or more oximetry parameters may be based on measurement of spectrophotometric optical absorption, that is the absorption of light by components in the blood sample 52.

Determining one or more one or more oximetry parameters may comprise measuring at least total hemoglobin (THB) and one or more of hemoglobin fractions, such as the following: oxyhemoglobin (O2HB), methemoglobin (METHB), deoxyhemoglobin (HHB), carboxyhemoglobin (COHB).

Analyzing blood may comprise inputting and evacuating a wash solution into the microchannel 22 of the sample vessel 12 before and/or after introducing the blood sample 52 into the microchannel 22. In some embodiments, the at least one piezo element 14 may be activated to produce acoustic waves and/or shear forces to agitate the wash solution in the microchannel 22. In some embodiments, the sample vessel 12 may be used, cleaned, and re-used. In some embodiments, the lysis device 10 may not be reusable, and may be replaced for each blood sample 52. To that end, in some embodiments, the lysis device 10 may be discarded after a single use.

The method of using the analyzer 100 may further comprise calibrating the analyzer 100 with a blank sample. In some embodiments, the fluidic sample 52 may be a test sample known as a "blank sample" that may be used to calibrate the analyzer 100. The blank sample may contain a die solution, which may be used to measure scattering of the transmission of the medium.

In some embodiments, the blood sample 52 may be approximately twelve microliters in volume. The blood sample typically comprises plasma and red blood cells (which may comprise 45%-60% of the blood sample) and possibly lipids.

In some embodiments, the blood sample 52 may be held at a consistent temperature. In some embodiments, the temperature of the blood sample 52 may be approximately thirty-seven degrees Celsius plus or minus approximately 0.3 degree. In some embodiments, the temperature of the blood sample 52 may be less than forty degrees Celsius or at a temperature configured to avoid damage to the blood sample 52. In some embodiments, the blood sample 52 may be held at a substantially consistent temperature utilizing the one or more temperature sensors and/or the one or more thermal control elements.

An example of the analyzer 100 and the lysis device 10 in use will now be described. In one example, the sample vessel 12 may be made of glass and may have a length-to-width aspect ratio in a range of about 1.4 to about 1.9, and the microchannel 22 may have a height-to-width aspect ratio of about 0.05 (for example, having a height of about 100 micrometers and a width of about two millimeters). The sample vessel 12 may be inserted in a path that the medium will travel between the transmitter 112 and the receiver 114 of the absorbance spectrophotometer 102. It should be understood that the analyzer 100 may be provided with various instruments including mirrors and/or waveguides to direct the medium through the path. The fluidic distribution system 104 may insert the blood sample 52 into the microchannel 22 of the sample vessel 12.

The controller 106 may be electrically connected to the at least one piezo element 14 of the sample vessel 12, and may provide electrical signals to the at least one piezo element 14 to cause the at least one piezo element 14 to emit ultrasonic sound waves through a frequency sweep (e.g., range of frequencies from approximately 330 kHz to approximately 350 kHz) over a duration of time t (e.g., two seconds). In some embodiments, the controller 106 may receive measurement of a vibration signal due to the emitted ultrasonic sound waves. The measurement may be transmitted from the at least one piezo element 14 (FIG. 1A), piezo element 14b (FIG. 1B), and/or an external sensor. The controller 106 may compare signals (e.g., amplitude, decay envelope) to determine resonant frequency of the sample vessel 12 and/or blood sample 52. The determined resonant frequency may be used to calibrate the at least one piezo element 14 and/or provide ultrasonic sound waves based on the determined resonant frequency to lyse blood cells of the blood sample 52.

In some embodiments, the non-transitory computer readable medium 142 may store computer executable instructions that when executed by one or more processors 140 of the controller 106 may cause the one or more processors 140 to pass signals to the at least one piezo element 14 connected to the sample vessel 12 having a microchannel 22 containing the blood sample 52 having blood cells and plasma, that cause the at least one piezo element 14 to emit ultrasonic acoustic waves into the sample vessel 12 at a frequency, intensity and duration to lyse the blood cells within the blood sample 52.

In some embodiments, the frequency range includes the resonant frequency for the monolithic structure of the lysis device 10 with the blood sample 52, thereby causing cavitation in the blood sample 52, which ruptures the cell walls of the blood cells in the blood sample 52. Additionally, or alternatively, the controller 106 may cause the one or more processors 140 to pass signals to the at least one piezo element 14 that may cause the at least one piezo element 14 to elongate and contract, thereby producing shear forces in the blood sample 52 in the microchannel 22, which rupture the cell walls of the blood cells in the blood sample 52.

In some embodiments, a majority (more than 50%) of the cell walls of the blood cells may be ruptured.

The transmitter 112 of the absorbance spectrophotometer 102 may be activated to transmit the medium 116, such as light, through the sample vessel 12 into the lysed blood sample 52. The receiver 114 may receive at least portions of the medium 116 that exits the lysed blood sample 52 and the sample vessel 12. The receiver 114 may include one or more photodiodes, for example, for generating an electrical signal due to reception of the medium 116.

The analyzer 100, or the one or more processors 140, may determine one or more analytes present in the lysed blood sample 52 based at least in part on a signal indicative of the light received by the receiver 114 of the absorbance spectrophotometer 102. The analyzer 100, or one or more computer processors, may further analyze spectral profile coefficients of hemoglobin forms, such as one or more of the following: carboxyhemoglobin (COHB), oxyhemoglobin (O2HB), methemoglobin (METHB), deoxyhemoglobin (HHB), neonatal Bilirubin (NBILI), Cyan Methemoglobin (CN_MET_B), Sulfhemoglobin (SULF_HIGH), Methylene blue dye (METH_BLUE_A).

The analyzer 100, or the one or more processors 140, may measure total hemoglobin (THB) and/or one or more of hemoglobin fractions, such as the following: oxyhemoglobin (O2HB), methemoglobin (METHB), deoxyhemoglobin (HHB), carboxyhemoglobin (COHB).

The analyzer 100, or the one or more processors 140, may output the result of the analyses. The output may be shown on one or more display. The output may be used to determine treatment of the patient.

CONCLUSION

Conventionally, blood analysis was not available at the point-of-care of patients or was time consuming and expensive. In accordance with the present disclosure, the lysis device 10 is disclosed which provides improved accuracy and precision of measured parameters of a blood sample within a desired time-to-result at the point of care of a patient, and that is more easily manufactured and with less cost, wherein the lysis device 10 is configured to cooperate with the analyzer 100. The lysis device 10 may be configured to lyse red blood cells in a sample vessel by means of ultrasonic acoustic waves, pressure, fluid movement, and/or shear forces, generated in the vessel by a single piezo element driven at one or more particular excitation frequency, or range of frequencies. The optimum frequency for the sound waves generated by the single piezo element may include, or exclude the natural resonant frequency of the piezo, sample vessel, blood sample, and/or surrounding parts of the lysis device 10 and/or analyzer 100.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features and steps are recited in the claims and/or disclosed in the specification, these combinations are not intended to limit the disclosure. In fact, many of these features and steps may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A lysis device, comprising:
   a sample vessel having a microchannel formed therein, the sample vessel having at least one port extending through a surface to the microchannel;
   at least one piezo element attached to the surface of the sample vessel; and
   a controller having logic to cause the controller to:
     emit a first signal including a series of frequencies interleaved with observation periods to the at least one piezo element to cause the at least one piezo element to generate ultrasonic acoustic standing waves in the sample vessel;

receive a second signal indicative of measured vibration signals resulting from the first signal causing the sample vessel to vibrate, the measured vibration signals detected by the at least one piezo element during respective observation periods, each of the measured vibration signals resulting from the first signal having a particular frequency of the series of frequencies and having a decay envelope having a signal strength;

determine the particular frequency of the series of frequencies that results in a particular measured vibration signal of the measured vibration signals having a first decay envelope having a first signal strength greater than a second signal strength of a second decay envelope of at least one other measured vibration signal of the measured vibration signals;

determine a resonant frequency of the sample vessel based on the particular frequency of the series of frequencies that results in the particular measured vibration signal of the measured vibration signals having the first decay envelope having the first signal strength greater than the second signal strength of the second decay envelope of the at least one other measured vibration signal of the measured vibration signals; and drive the at least one piezo element with one or more third signal at the resonant frequency to lyse cells within a fluid sample.

2. The lysis device of claim 1, wherein the at least one piezo element is a single piezo transducer configured to generate ultrasonic acoustic standing waves to the sample vessel and measure vibration signals.

3. The lysis device of claim 1, wherein the fluid sample is a blood sample, and the microchannel includes the blood sample.

4. The lysis device of claim 1, wherein the at least one piezo element includes a piezo transducer separate from a piezo sensor, with at least one of the piezo transducer and piezo sensor configured to be spring loaded to the sample vessel.

5. The lysis device of claim 4, wherein the piezo transducer is bonded to the surface of the sample vessel and the piezo sensor is external and separate from the sample vessel.

6. The lysis device of claim 4, wherein the piezo transducer is bonded to the surface of the sample vessel and the piezo sensor is spring loaded to the surface of the sample vessel.

7. The lysis device of claim 4, wherein the piezo transducer and the piezo sensor are attached to an outer surface of the sample vessel.

8. The lysis device of claim 4, wherein the piezo transducer is attached to an outer surface of the sample vessel and the piezo sensor is separated and external to the sample vessel.

9. The lysis device of claim 4, wherein the ultrasonic acoustic standing waves are generated by the piezo transducer and the piezo sensor measures the measured vibration signals resulting from the first signal causing the sample vessel to vibrate.

10. The lysis device of claim 1, wherein the controller has a non-transitory memory connected to a processor, the non-transitory memory storing the logic, the logic being computer executable instructions, that when executed by the processor, cause the processor to:

drive the at least one piezo element with the first signal to generate ultrasonic acoustic standing waves at a first frequency sweep for a first duration of time;

adjust the at least one piezo element to cease providing the first signal;

receive, from the at least one piezo element, the second signal indicative of the measured vibration signals, each of the measured vibration signals resulting from the first signal having a particular frequency of the series of frequencies and having a decay envelope having a signal strength;

determine the particular frequency of the series of frequencies that results in a particular measured vibration signal of the measured vibration signals having a first decay envelope having a first signal strength greater than a second signal strength of a second decay envelope of at least one other measured vibration signal of the measured vibration signals;

determine a resonant frequency of the sample vessel based on the particular frequency of the series of frequencies that results in the particular measured vibration signal of the measured vibration signals having the first decay envelope having the first signal strength greater than the second signal strength of the second decay envelope of the at least one other measured vibration signals; and drive the at least one piezo element with the one or more third signal at the resonant frequency.

11. The lysis device of claim 10, wherein the sample vessel is constructed of glass.

12. The lysis device of claim 11, wherein the processor further determines an estimated resonant frequency based on composition of the glass.

13. The lysis device of claim 12, wherein the first frequency sweep includes the estimated resonant frequency.

14. An analyzer, comprising:
a lysis device, the lysis device having:
a sample vessel having a microchannel formed therein, the sample vessel having at least one port extending through a surface to the microchannel;
at least one piezo element attached to the surface of the sample vessel;
a controller having logic to cause the controller to:
emit a first signal including a series of frequencies interleaved with observation periods to the at least one piezo element to cause the at least one piezo element to generate ultrasonic acoustic standing waves in the sample vessel;
receive a second signal indicative of measured vibration signals resulting from the first signal causing the sample vessel to vibrate, the measured vibration signals detected by the at least one piezo element during respective observation periods, each of the measured vibration signals resulting from the first signal having a particular frequency of the series of frequencies and having a decay envelope having a signal strength;
determine the particular frequency of the series of frequencies that results in a particular measured vibration signal of the measured vibration signals having a first decay envelope having a first signal strength greater than a second signal strength of a second decay envelope of at least one other measured vibration signal of the measured vibration signals;

determine a resonant frequency of the sample vessel based on the particular frequency of the series of frequencies that results in the particular measured vibration signal of the measured vibration signals having the first decay envelope having the first signal strength greater than the second signal strength of the second decay envelope of the at least one other measured vibration signal of the measured vibration signals; and drive the at least one piezo element with one or more third signal at the resonant frequency to lyse cells within a fluid sample; and an absorbance spectrophotometer comprising a transmitter and a receiver, the transmitter positioned to emit a light medium through the microchannel, and the receiver positioned to receive at least a portion of the light medium after the portion of the light medium has passed through the microchannel.

15. The analyzer of claim 14, wherein the first signal includes ultrasonic acoustic standing waves generated at a first frequency sweep by the at least one piezo element and the second signal is indicative of the measured vibration signals resulting from the ultrasonic acoustic standing waves causing the sample vessel to vibrate.

16. The analyzer of claim 14, wherein the piezo element includes a first piezo element configured to generate the first signal and a second piezo element configured to measure the second signal.

17. The analyzer of claim 14, wherein the controller has a non-transitory memory connected to a processor, the non-transitory memory having the logic, the logic being a set of computer executable instructions, that when executed by the processor, cause the processor to drive the at least one piezo element to emit the first signal and receive the second signal.

18. The analyzer of claim 17, wherein the set of computer executable instructions causes the processor to determine the particular frequency, determine the resonant frequency, and drive the at least one piezo element with the one or more third signal based on the resonant frequency.

19. The analyzer of claim 18, wherein the sample vessel is constructed of glass and the set of computer executable instructions causes the processor to determine an estimated resonant frequency based on composition of the glass wherein the first signal is at the estimated resonant frequency.

* * * * *